(12) United States Patent
Smith

(10) Patent No.: US 8,207,102 B2
(45) Date of Patent: Jun. 26, 2012

(54) COMPOSITIONS INCLUDING HARDNESS ION AND THRESHOLD AGENT AND METHODS EMPLOYING THEM TO REDUCE CORROSION AND ETCH

(75) Inventor: Kim R. Smith, Woodbury, MN (US)

(73) Assignee: Ecolab USA Inc., St. Paul, MN (US)

( * ) Notice: Subject to any disclaimer, the term of this patent is extended or adjusted under 35 U.S.C. 154(b) by 247 days.

(21) Appl. No.: 12/114,364

(22) Filed: May 2, 2008

(65) Prior Publication Data

US 2008/0287335 A1 Nov. 20, 2008

Related U.S. Application Data

(60) Provisional application No. 60/927,575, filed on May 4, 2007.

(51) Int. Cl.
*C11D 17/00* (2006.01)
*C11D 3/37* (2006.01)
*C11D 3/60* (2006.01)
*B08B 7/00* (2006.01)

(52) U.S. Cl. ........ 510/108; 510/180; 510/189; 510/214; 510/238; 510/401; 510/475; 134/42

(58) Field of Classification Search .............. 510/401, 510/108, 180, 189, 214, 238, 475; 134/42
See application file for complete search history.

(56) References Cited

U.S. PATENT DOCUMENTS

| | | | |
|---|---|---|---|
| 1,638,803 A | 8/1927 | Gibson et al. | |
| 3,898,186 A * | 8/1975 | Mermelstein et al. | 510/236 |
| 3,931,031 A | 1/1976 | Willard, Sr. | |
| 3,932,224 A | 1/1976 | Hirota et al. | |
| 4,036,749 A | 7/1977 | Anderson | |
| 4,038,430 A | 7/1977 | Drake et al. | |
| 4,150,001 A | 4/1979 | Sen | |
| 4,174,291 A | 11/1979 | Benjamin et al. | |
| 4,342,665 A * | 8/1982 | Itoh et al. | 524/156 |
| 4,389,323 A | 6/1983 | Gancy | |
| 4,435,307 A | 3/1984 | Barbesgaard et al. | |
| 4,443,270 A | 4/1984 | Biard et al. | |
| 4,678,685 A | 7/1987 | Hasson et al. | |
| 4,713,159 A | 12/1987 | Truitt et al. | |
| 4,820,439 A | 4/1989 | Rieck | |
| 4,844,828 A | 7/1989 | Aoki | |
| 4,908,148 A | 3/1990 | Caravajal et al. | |
| 4,917,812 A | 4/1990 | Cilley | |
| 4,966,606 A | 10/1990 | Garner-Gray et al. | |
| 5,152,904 A | 10/1992 | Kedem et al. | |
| 5,182,028 A | 1/1993 | Boffardi et al. | |
| 5,277,823 A | 1/1994 | Hann et al. | |
| 5,308,403 A | 5/1994 | Yam et al. | |
| 5,364,551 A | 11/1994 | Lentsch et al. | |
| 5,376,310 A | 12/1994 | Cripe et al. | |
| 5,407,471 A | 4/1995 | Rohr et al. | |
| 5,431,836 A | 7/1995 | Carr et al. | |
| 5,540,866 A | 7/1996 | Aszman et al. | |
| 5,624,892 A | 4/1997 | Angevaare et al. | |
| 5,658,867 A | 8/1997 | Pancheri et al. | |
| 5,698,506 A | 12/1997 | Angevaare et al. | |
| 5,733,865 A | 3/1998 | Pancheri et al. | |
| 5,750,086 A | 5/1998 | You | |
| 5,783,539 A | 7/1998 | Angevaare et al. | |
| 5,863,877 A | 1/1999 | Carr et al. | |
| 5,874,397 A | 2/1999 | Schimmel et al. | |
| 5,879,562 A | 3/1999 | Garbutt | |
| 5,929,010 A * | 7/1999 | Kellett et al. | 510/276 |
| 5,993,737 A | 11/1999 | Mackintosh et al. | |
| 5,998,356 A * | 12/1999 | Alam et al. | 510/443 |
| 6,057,278 A * | 5/2000 | Gosselink et al. | 510/400 |
| 6,083,894 A | 7/2000 | Keyes et al. | |
| 6,121,226 A * | 9/2000 | Gosselink et al. | 510/400 |
| 6,221,146 B1 | 4/2001 | Fortier et al. | |
| 6,291,415 B1 * | 9/2001 | Watson et al. | 510/400 |
| 6,299,701 B1 | 10/2001 | Aubay et al. | |
| 6,365,101 B1 | 4/2002 | Nguyen et al. | |
| 6,402,824 B1 | 6/2002 | Freeman et al. | |
| 6,448,210 B1 | 9/2002 | Keyes et al. | |
| 6,610,645 B2 | 8/2003 | Pancheri et al. | |
| 6,622,736 B1 | 9/2003 | Hahn | |
| 6,652,747 B2 | 11/2003 | Hvarre | |
| 6,660,167 B1 | 12/2003 | Walder et al. | |

(Continued)

FOREIGN PATENT DOCUMENTS

EP 0008211 B1 12/1981

(Continued)

OTHER PUBLICATIONS

Author Unknown, "Introducing Revolutionary Nano-Crystal Technology for Eliminating Scale," ScaleX2- Revolutionary Scale Prevention Technology, OptiPure, http://www.optipurewater.com/Downloads/Other_downloads/SX2Techbro.pdf.

(Continued)

*Primary Examiner* — Lorna M Douyon
(74) *Attorney, Agent, or Firm* — Andrew D. Sorensen; Laura C. Dilorenzo; Amy J. Hoffman

(57) ABSTRACT

The present invention relates to compositions including a mixture of hardness ions (e.g., magnesium and calcium ions) in an amount greater than the amount of threshold agent, which have a beneficial effect on etch or corrosion during cleaning. The present compositions can reduce corrosion or etch of glass and aluminum. The present invention also relates to methods employing these compositions.

10 Claims, 2 Drawing Sheets

U.S. PATENT DOCUMENTS

| | | |
|---|---|---|
| 6,685,908 B1 | 2/2004 | Yaniv |
| 6,686,325 B2 | 2/2004 | Hoyt et al. |
| 6,693,071 B2 | 2/2004 | Ghosh et al. |
| 6,694,989 B2 | 2/2004 | Everson et al. |
| 6,764,986 B1* | 7/2004 | Busch et al. ............. 510/101 |
| 6,777,384 B2 | 8/2004 | Raths et al. |
| 6,790,822 B1* | 9/2004 | Baba et al. ............... 510/471 |
| 6,794,345 B2 | 9/2004 | Elsner et al. |
| 6,806,245 B2 | 10/2004 | Hahn |
| 6,815,410 B2 | 11/2004 | Boutique et al. |
| 6,835,702 B2 | 12/2004 | Herdt et al. |
| 6,881,713 B2 | 4/2005 | Sommerville-Roberts et al. |
| 6,916,777 B2 | 7/2005 | Connor et al. |
| 6,992,052 B2 | 1/2006 | Song |
| 7,026,278 B2 | 4/2006 | Price et al. |
| 7,033,980 B2 | 4/2006 | Waits et al. |
| 7,063,895 B2 | 6/2006 | Rodrigues et al. |
| 7,077,963 B2 | 7/2006 | McConchie et al. |
| 7,087,662 B2 | 8/2006 | Ghosh et al. |
| 7,094,740 B2 | 8/2006 | Berger et al. |
| 7,101,833 B2 | 9/2006 | Berger et al. |
| 7,135,448 B2 | 11/2006 | Lentsch et al. |
| 7,153,816 B2 | 12/2006 | Kessler et al. |
| 7,241,726 B2 | 7/2007 | Song et al. |
| 7,273,558 B2 | 9/2007 | Miecznik |
| 7,320,957 B2 | 1/2008 | Brooker et al. |
| 7,467,633 B2* | 12/2008 | Smith et al. ............... 134/25.2 |
| 2002/0071783 A1 | 6/2002 | Fader et al. |
| 2002/0111285 A1 | 8/2002 | Price et al. |
| 2002/0169095 A1* | 11/2002 | Forth et al. ............... 510/295 |
| 2002/0172773 A1 | 11/2002 | Ghosh et al. |
| 2003/0008794 A1 | 1/2003 | Jaynes |
| 2003/0008801 A1 | 1/2003 | Raths et al. |
| 2003/0045439 A1* | 3/2003 | Evers ....................... 510/238 |
| 2003/0050205 A1 | 3/2003 | Hahn |
| 2003/0073596 A1 | 4/2003 | Chiou et al. |
| 2003/0078176 A1 | 4/2003 | Elsner et al. |
| 2003/0111097 A1 | 6/2003 | Everson et al. |
| 2003/0166492 A1 | 9/2003 | Holderbaum et al. |
| 2003/0166493 A1 | 9/2003 | Holderbaum et al. |
| 2004/0034905 A1 | 2/2004 | Underwood et al. |
| 2004/0048760 A1 | 3/2004 | Rabon et al. |
| 2004/0058846 A1 | 3/2004 | Kistenmacher et al. |
| 2004/0121926 A1 | 6/2004 | Waits et al. |
| 2004/0147427 A1 | 7/2004 | Waits et al. |
| 2004/0162226 A1 | 8/2004 | Sunder et al. |
| 2004/0167048 A1 | 8/2004 | Sunder et al. |
| 2004/0176264 A1 | 9/2004 | Song et al. |
| 2004/0176269 A1 | 9/2004 | Song |
| 2004/0180807 A1 | 9/2004 | Song et al. |
| 2004/0220068 A1 | 11/2004 | Hahn |
| 2004/0259751 A1 | 12/2004 | Kessler et al. |
| 2005/0003979 A1 | 1/2005 | Lentsch et al. |
| 2005/0020464 A1 | 1/2005 | Smith et al. |
| 2005/0075258 A1 | 4/2005 | Kessler et al. |
| 2005/0087213 A1 | 4/2005 | Hahn |
| 2005/0098499 A1 | 5/2005 | Hussain |
| 2005/0113271 A1 | 5/2005 | Pegelow et al. |
| 2005/0119150 A1 | 6/2005 | Pegelow et al. |
| 2005/0119154 A1 | 6/2005 | Song et al. |
| 2005/0137106 A1 | 6/2005 | Song et al. |
| 2005/0143278 A1 | 6/2005 | Pegelow et al. |
| 2005/0143280 A1 | 6/2005 | Nelson et al. |
| 2005/0148479 A1 | 7/2005 | Barthel et al. |
| 2005/0148488 A1 | 7/2005 | Jekel et al. |
| 2005/0153868 A1 | 7/2005 | Berger et al. |
| 2005/0155131 A1 | 7/2005 | Underwood et al. |
| 2005/0181962 A1 | 8/2005 | Pegelow et al. |
| 2005/0187136 A1 | 8/2005 | Pegelow et al. |
| 2005/0187137 A1 | 8/2005 | Pegelow et al. |
| 2005/0225003 A1 | 10/2005 | Holderbaum et al. |
| 2005/0233925 A1 | 10/2005 | Foley et al. |
| 2005/0239680 A1 | 10/2005 | Buchmeier et al. |
| 2005/0253116 A1 | 11/2005 | Hahn |
| 2005/0261156 A1 | 11/2005 | Kottwitz et al. |
| 2005/0261158 A1 | 11/2005 | Kottwitz et al. |
| 2006/0030506 A1 | 2/2006 | Song et al. |
| 2006/0035807 A1 | 2/2006 | Kasturi et al. |
| 2006/0046954 A1 | 3/2006 | Smith et al. |
| 2006/0069001 A1 | 3/2006 | Song |
| 2006/0069002 A1 | 3/2006 | Song et al. |
| 2006/0069003 A1 | 3/2006 | Song et al. |
| 2006/0069004 A1 | 3/2006 | Song et al. |
| 2006/0069005 A1 | 3/2006 | Song |
| 2006/0075576 A1 | 4/2006 | Price et al. |
| 2006/0079430 A1 | 4/2006 | Berger et al. |
| 2006/0079437 A1 | 4/2006 | Kondo et al. |
| 2006/0089294 A1 | 4/2006 | Depoot et al. |
| 2006/0094634 A1 | 5/2006 | Jekel et al. |
| 2006/0116304 A1 | 6/2006 | McRitchie et al. |
| 2006/0116309 A1 | 6/2006 | Lambotte et al. |
| 2006/0122089 A1 | 6/2006 | Lambotte et al. |
| 2006/0123852 A1 | 6/2006 | Wiedemann et al. |
| 2006/0128602 A1 | 6/2006 | Lentsch et al. |
| 2006/0135394 A1 | 6/2006 | Smith et al. |
| 2006/0157084 A1 | 7/2006 | Wiedemann et al. |
| 2006/0189508 A1 | 8/2006 | Brooker et al. |
| 2006/0194708 A1 | 8/2006 | Barthel et al. |
| 2006/0199750 A1 | 9/2006 | Berger et al. |
| 2006/0217286 A1 | 9/2006 | Geoffroy et al. |
| 2006/0223734 A1 | 10/2006 | Bayersdoerfer et al. |
| 2006/0223738 A1 | 10/2006 | Holderbaum et al. |
| 2006/0234900 A1 | 10/2006 | Olson et al. |
| 2006/0258556 A1 | 11/2006 | Holderbaum et al. |
| 2006/0270580 A1 | 11/2006 | Smith et al. |
| 2007/0004611 A1* | 1/2007 | Ospinal et al. ............ 510/152 |
| 2007/0017553 A1 | 1/2007 | Neplenbroek et al. |
| 2008/0020960 A1* | 1/2008 | Smith et al. .............. 510/267 |
| 2008/0234164 A1 | 9/2008 | Tyborski |
| 2008/0274928 A1 | 11/2008 | Smith et al. |
| 2008/0274930 A1 | 11/2008 | Smith et al. |
| 2008/0274932 A1 | 11/2008 | Smith et al. |
| 2008/0274933 A1 | 11/2008 | Fernholz et al. |
| 2008/0274939 A1 | 11/2008 | Monsrud et al. |
| 2008/0276967 A1 | 11/2008 | Smith et al. |
| 2008/0280800 A1 | 11/2008 | Smith et al. |
| 2008/0287334 A1 | 11/2008 | Smith et al. |
| 2008/0287335 A1 | 11/2008 | Smith |
| 2008/0300160 A1 | 12/2008 | Smith et al. |
| 2009/0054287 A1 | 2/2009 | Smith et al. |
| 2009/0054290 A1 | 2/2009 | Fernholz et al. |
| 2009/0149363 A1 | 6/2009 | Smith et al. |
| 2009/0165818 A1 | 7/2009 | Smith et al. |

FOREIGN PATENT DOCUMENTS

| | | | |
|---|---|---|---|
| EP | 0241962 | | 5/1990 |
| EP | 0406662 | | 3/1995 |
| EP | 130756 | | 6/2000 |
| EP | 0828812 | | 10/2001 |
| EP | 1253188 | | 10/2002 |
| GB | 607274 | | 8/1948 |
| GB | 784750 | | 12/1957 |
| GB | 1437950 | | 6/1976 |
| JP | 58059280 A | * | 4/1983 |
| JP | 4104885 | | 4/1992 |
| JP | 10005005 A | * | 1/1998 |
| JP | 10118638 | | 5/1998 |
| JP | 2003-525104 | | 8/2003 |
| JP | 2007-292389 | | 11/2007 |
| KR | 810000367 | | 4/1981 |
| KR | 10-2004-0019262 | | 3/2004 |
| KR | 10-2006-0003294 | | 1/2006 |
| WO | WO92/03529 | | 3/1992 |
| WO | WO93/18140 | | 9/1993 |
| WO | WO94/25583 | | 11/1994 |
| WO | WO95/10591 | | 4/1995 |
| WO | WO95/10615 | | 4/1995 |
| WO | WO95/29979 | | 11/1995 |
| WO | WO95/30010 | | 11/1995 |
| WO | WO95/30011 | | 11/1995 |
| WO | WO98/40455 | | 9/1998 |
| WO | WO2006/128498 | | 12/2006 |

OTHER PUBLICATIONS

Berner, R.A., "The Role of Magnesium in the Crystal Growth of Calcite and Aragonite from Sea Water," Geochimica et Cosmochimica Acta, vol. 39, Issue 4, Apr. 1975, pp. 489-494.
Bischoff, J.L. and Fyfe, W.S., "Catalysis, Inhibition, and The Calcite-Aragonite Problem," American Journal of Science, vol. 266, Feb. 1968, pp. 65-79.
Ceramic Filters Company, Technical water filtration information on the AquaCera water filter, 3 pages.
Coetzee et al., "Scale reduction and scale modification effects induced by Zn and other metal species in physical water treatment", Water SA, vol. 24 No. 1 Jan. 1998, 77-84, ISSN: 0378-4738.
Colfen et al., "A Systematic Examination of the Morphogenesis of Calcium Carbonate in the Presence of a Double-Hydrophilic Block Copolymer", Chem. Eur. J. 2001, 7, No. 1, 106-116, 11 pages.
Gibson, Aileen and Maniocha, Michael, "The Use of Magnesium Hydroxide Slurry for Biological Treatment of Municipal and Industrial Wastewater," Martin Marietta Magnesia Specialties, LLC, white paper, 7 pgs.
Jiao, Yunfeng, et al., "The co-effect of collagen and magnesium ions on calcium carbonate biomineralization", Materials Science and Engineering C26 (2006) 648-652.
Jung et al., "Effect of monovalent salts on morphology of calcium carbonate crystallized in Couette-Taylor reactor", Cryst. Res. Technol. 40, No. 6, 568-592 (2005), 7 pages.

Kitamura, Mitsutaka, "Crystallization and Transformation Mechanism of Calcium Carbonate Polymorphs and the Effect of Magnesium Ion", Journal of Colloid and Interface Science 236, 318-327 (2001), ISSN 0021-9797.
Kawaguchi, H. et al., "Crystallization of Inorganic Compounds in Polymer Solutions. Part I: Control of Shape and Form of Calcium Carbonate," Colloid Polym Sci, vol. 270, 1992, pp. 1176-1181.
Lee, Inhyung et al., "Nanoparticle-Directed Crystallization of Calcium Carbonate," Advanced Materials, Jul. 3, 2001, 4 pgs.
Loste, Eva et al., "The role of magnesium in stabilizing amorphous calcium carbonate and controlling calcite morphologies", Journal of Crystal Growth 254 (2003), pp. 206-218.
Meyer, H.J., "The Influence of Impurities on the Grown Rate of Calcite," Journal of Crystal Growth, vol. 66, 1984, pp. 639-646.
Takayuki, Saito and Takuhisa, Handa, "Improvement in the Water Recovery and Scale Prevention of an RO System," Ebara Engineering Review, vol. 199, 2003, pp. 30-34.
Woon-Kyoung Park, "Crystal Growth of Aragonite Precipitated Calcium Carbonate by Seeded Method,", Materials Science Forum vols. 544-545 (2007) pp. 693-696.

* cited by examiner

COMPOSITIONS INCLUDING HARDNESS ION AND THRESHOLD AGENT AND METHODS EMPLOYING THEM TO REDUCE CORROSION AND ETCH

CROSS-REFERENCE TO RELATED APPLICATION

This application claims priority to U.S. Provisional Application Ser. No. 60/927,575 filed on May 4, 2007 and entitled "Compositions Containing Magnesium Salts and Methods of Using", the disclosure of which is incorporated herein by reference.

This application is also related to: U.S. patent application Ser. No. 12/114,486, entitled "Cleaning Compositions with Water Insoluble Conversion Agents and Methods of Making and Using Them"; now U.S. Pat. No. 8,071,528; U.S. patent application Ser. No. 12/114,355, entitled, "Composition For In Situ Manufacture Of Insoluble Hydroxide When Cleaning Hard Surfaces And For Use In Automatic Warewashing Machines, And Methods For Manufacturing And Using"; U.S. patent application Ser. No. 12/114,448, entitled "Water Treatment System and Downstream Cleaning Methods"; U.S. patent application Ser. No. 12/114,327, entitled "Water Soluble Magnesium Compounds as Cleaning Agents and Methods of Using Them" U.S. patent application Ser. No. 12/114,513, entitled "Cleaning Compositions Containing Water Soluble Magnesium Compounds and Methods of Using Them", now U.S. Pat. No. 7,749,329; U.S. patent application Ser. No. 12/114,428, entitled "$MG_{++}$ Chemistry and Method for Fouling Inhibition in Heat Processing of Liquid Foods and Industrial Processes", now U.S. Pat. No. 8,143,204; U.S. patent application Ser. No. 12/114,329, entitled "Compositions Including Hardness Ion and Gluconate and Methods Employing Them to Reduce Corrosion and Etch", now U.S. Pat. No. 7,709,434; U.S. patent application Ser. No. 12/114,342, entitled "Compositions Including Hardness Ion and Silicate and Methods Employing Them to Reduce Corrosion and Etch", now U.S. Pat. No. 7,960,329; and U.S. patent application Ser. No. 12/114,385, entitled "Warewashing Compositions for Use in Automatic Dishwashing Machines and Method for Using", now U.S. Pat. No. 8,021,493, —all commonly assigned to Ecolab, Inc., are filed on the same date as this application being May 2, 2008 and are all incorporated herein by reference for all purposes.

FIELD OF THE INVENTION

The present invention relates to compositions including a mixture of hardness ions (e.g., magnesium and calcium ions) in an amount greater than the amount of threshold agent, which have a beneficial effect on etch or corrosion during cleaning. The present compositions can reduce corrosion or etch of glass and aluminum. The present invention also relates to methods employing these compositions.

BACKGROUND OF THE INVENTION

The level of hardness in water can have a deleterious effect in many systems. For example, when hard water is used in conjunction with cleaning compositions, hard water can cause precipitation of hard water scale or components of a cleaning agent. In general, hard water refers to water having a level of calcium and magnesium ions in excess of about 100 ppm. Often, the molar ratio of calcium to magnesium in hard water is about 2:1 or about 3:1. Although most locations have hard water, water hardness tends to vary from one location to another.

Hard water can cause stains on articles as a result of a visible film depositing onto the surface of the articles. The film may be caused by calcium present in hard water precipitating and depositing onto the surface. To prevent such precipitation, cleaning compositions can include a threshold agent. A threshold inhibitor or threshold agent inhibits crystallization of water hardness ions (e.g., calcium containing salts) from solution, but does not necessarily form a specific complex with the water hardness ion.

In some circumstances, precipitation of calcium salts can be beneficial. Etching or corrosion of glass or aluminum is a common problem in warewashing and surface cleaning. Glassware that is repetitively washed in automatic dishwashing machines has a tendency to develop a surface cloudiness that is irreversible. The cloudiness can manifest itself as an iridescent film that displays rainbow hues in light reflected from the glass surface. The glass becomes progressively more opaque with repeated washings. It is believed that the glassware corrosion problem relates to two separate phenomena; the first is corrosion or etching due to the leaching out of minerals from the glass composition itself together with hydrolysis of the silicate network, and the second is deposition and redeposition of silicate material onto the glass. Common corrosion inhibitors work by causing controlled precipitation of calcium salts, which can reduce such etching or corrosion.

Thus, it is counterintuitive to include a threshold agent, which normally prevents precipitation of calcium salts, in a corrosion inhibitor. Further, it is entirely unexpected that a mixture of hardness ions (e.g., magnesium ions and calcium ions) in an amount greater than the amount of threshold agent would have a beneficial effect on etch or corrosion.

SUMMARY OF THE INVENTION

Unexpectedly, the present inventors have developed compositions that synergistically reduce etch or corrosion or etch of glass and aluminum. The synergistic compositions include defined ratios of water soluble calcium salt, water soluble magnesium salt, and threshold agent, with the salts in excess over threshold agent. Synergy was determined from the data obtained from designed experiments and an analysis specifically focused on finding synergy. In an embodiment, a ratio of magnesium ions to calcium ions to threshold inhibitor effective for synergistically reducing the level of glass etching is about 3-7:1-4:1-4. In an embodiment, a ratio of magnesium ions to calcium ions to threshold inhibitor effective for synergistically reducing the level of aluminum etching is about 4-25:4-5:0.5-2. These ratios are based on experimental data discussed below in the Examples.

The present invention relates to compositions including a mixture of hardness ions (e.g., magnesium and calcium ions) in an amount greater than the amount of threshold agent, which have a beneficial effect on etch or corrosion during cleaning. The present invention also relates to methods employing these compositions.

In an embodiment, the present invention relates to a corrosion inhibiting composition. This composition can include about 5 to about 25 wt-% water soluble calcium salt and water soluble magnesium salt; and about 10 to about 50 wt-% threshold agent. In this composition, the water soluble magnesium salt and the water soluble calcium salt can be present at a weight ratio of greater than or equal to about 1:1. In this composition, the water soluble calcium salt and the threshold agent can be present at a weight ratio of greater than or equal to about 1:2.

In an embodiment, the present invention relates to a cleaning composition. This composition can include surfactant; alkalinity source; about 0.2 to about 12 wt-% water soluble calcium salt and water soluble magnesium salt; and about 0.1 to about 6 wt-% threshold agent. In this composition, the water soluble magnesium salt and the water soluble calcium salt can be present at a weight ratio of greater than or equal to about 1:1. In this composition, the water soluble calcium salt and the threshold agent can be present at a weight ratio of greater than or equal to about 1:2.

In an embodiment, the present invention relates to a detergent composition. This composition can include cleaning agent; alkalinity source; about 0.4 to about 9 wt-% water soluble calcium salt and water soluble magnesium salt; and about 0.2 to about 4 wt-% threshold agent. In this composition, the water soluble magnesium salt and the water soluble calcium salt are present in an amount in excess of the threshold capacity of the threshold agent.

In an embodiment, the present invention relates to a cleaning composition. This composition can include alkalinity source; about 0.5 to about 6 wt-% water soluble calcium salt and water soluble magnesium salt; and about 0.3 to about 2 wt-% threshold agent. In this composition, a weight ratio of the threshold inhibitor to the alkalinity source is at least about 1:10.

In an embodiment, the present invention relates to a method for reducing corrosion during cleaning with an alkaline detergent. This method can include contacting an object to be cleaned with a cleaning composition. The cleaning composition can include about 0.2 to about 12 wt-% water soluble calcium salt and water soluble magnesium salt; and about 0.1 to about 6 wt-% threshold agent. In this composition, the water soluble magnesium salt and the water soluble calcium salt can be present at a weight ratio of greater than or equal to about 1:1. In this composition, the water soluble calcium salt and the threshold agent can be present at a weight ratio of greater than or equal to about 1:2.

In an embodiment, the present invention relates to a method for reducing corrosion during cleaning. This method can include contacting an object to be cleaned with a cleaning composition. The cleaning composition can include alkalinity source; about 0.2 to about 12 wt-% water soluble calcium salt and water soluble magnesium salt; and about 0.1 to about 6 wt-% threshold agent. In this composition, a weight ratio of the threshold inhibitor to the alkalinity source is at least about 1:10.

DETAILED DESCRIPTION OF THE INVENTION

Definitions

Figure 1:
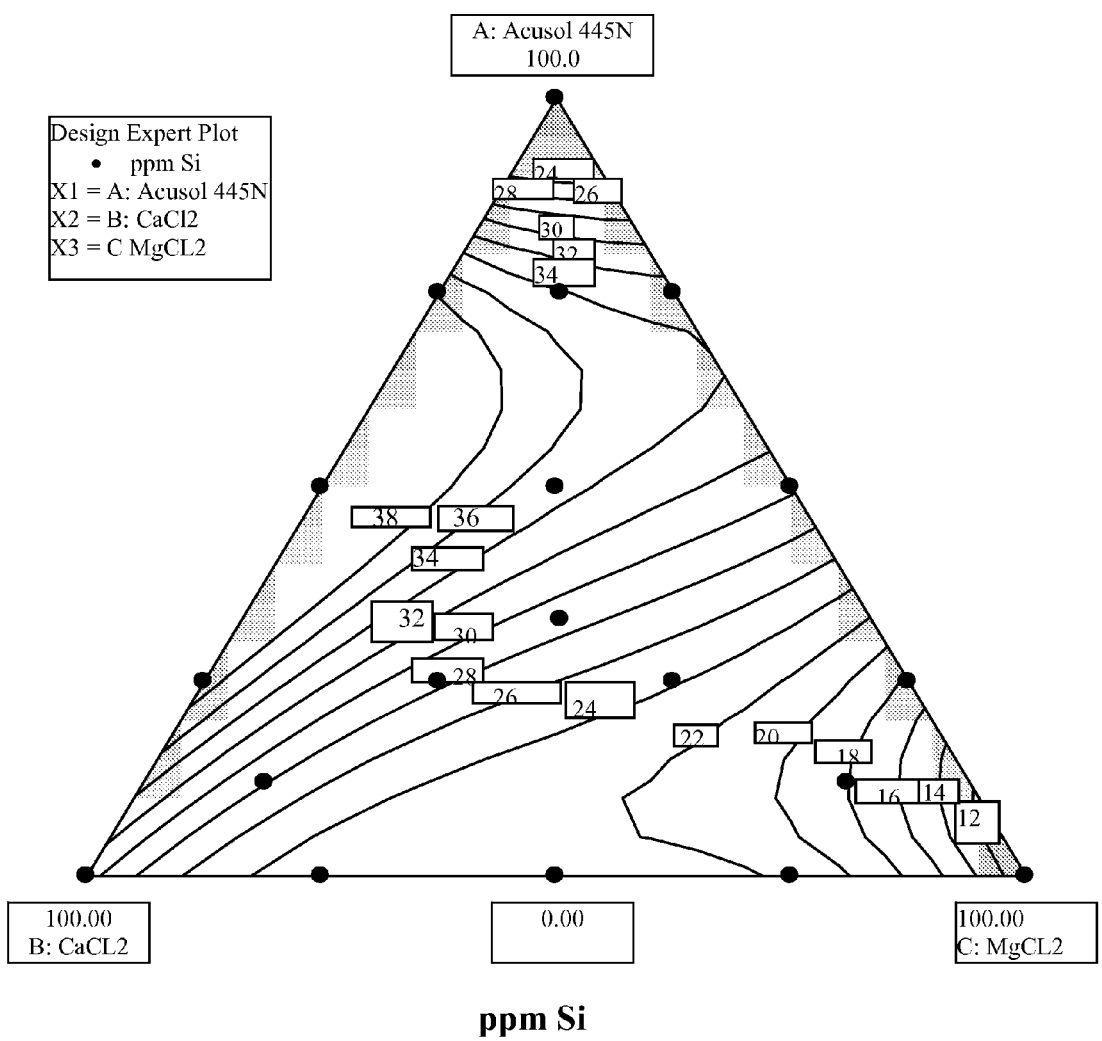
FIG. 1 shows data from Example 1 in the form of a ternary graph illustrating the reduced corrosion of glass as a function of the concentrations of magnesium chloride, calcium chloride, and threshold agent. The synergistic interaction of select ratios of these three components gave reduced glass dissolved from vial.

As used herein, the term "threshold agent" refers to a compound that inhibits crystallization of water hardness ions from solution, but that need not form a specific complex with the water hardness ion. This distinguishes a threshold agent from a chelating agent or sequestrant. Threshold agents include a polyacrylate, a polymethacrylate, an olefin/maleic copolymer, and the like.

As used herein, the term "water soluble" refers to a compound that can be dissolved in water at a concentration of more than 1 wt-%.

As used herein, the terms "sparingly soluble" or "sparingly water soluble" refer to a compound that can be dissolved in water only to a concentration of 0.1 to 1.0 wt-%.

As used herein, the terms "insoluble" and "water insoluble" refers to a compound that can be dissolved in water only to a concentration of less than 0.1 wt-%.

As used herein, the terms "chelating agent" and "sequestrant" refer to a compound that forms a complex (soluble or not) with water hardness ions (from the wash water, soil and substrates being washed) in a specific molar ratio. Chelating agents that can form a water soluble complex include sodium tripolyphosphate, EDTA, DTPA, NTA, citrate, and the like. Sequestrants that can form an insoluble complex include sodium triphosphate, zeolite A, and the like. As used herein, the terms "chelating agent" and "sequestrant" are synonymous.

As used herein, the term "antiredeposition agent" refers to a compound that helps keep soil suspended in water instead of redepositing onto the object being cleaned.

As used herein, the term "phosphate-free" refers to a composition, mixture, or ingredient that does not contain a phosphate or phosphate-containing compound or to which a phosphate or phosphate-containing compound has not been added. Should a phosphate or phosphate-containing compound be present through contamination of a phosphate-free composition, mixture, or ingredients, the amount of phosphate shall be less than 0.5 wt %. In an embodiment, the amount of phosphate is less then 0.1 wt-%. In an embodiment, the amount of phosphate is less than 0.01 wt %.

As used herein, the term "phosphorus-free" refers to a composition, mixture, or ingredient that does not contain phosphorus or a phosphorus-containing compound or to which phosphorus or a phosphorus-containing compound has not been added. Should phosphorus or a phosphorus-containing compound be present through contamination of a phosphorus-free composition, mixture, or ingredients, the amount of phosphorus shall be less than 0.5 wt %. In an embodiment, the amount of phosphorus is less than 0.1 wt-%. In an embodiment, the amount of phosphorus is less than 0.01 wt %.

"Cleaning" means to perform or aid in soil removal, bleaching, microbial population reduction, or combination thereof.

As used herein, the term "ware" includes items such as eating and cooking utensils. As used herein, the term "warewashing" refers to washing, cleaning, or rinsing ware.

As used herein, the term "hard surface" includes showers, sinks, toilets, bathtubs, countertops, windows, mirrors, transportation vehicles, floors, and the like.

As used herein, the phrase "health care surface" refers to a surface of an instrument, a device, a cart, a cage, furniture, a structure, a building, or the like that is employed as part of a health care activity. Examples of health care surfaces include surfaces of medical or dental instruments, of medical or dental devices, of autoclaves and sterilizers, of electronic apparatus employed for monitoring patient health, and of floors, walls, or fixtures of structures in which health care occurs. Health care surfaces are found in hospital, surgical, infirmity, birthing, mortuary, and clinical diagnosis rooms. These surfaces can be those typified as "hard surfaces" (such as walls, floors, bed-pans, etc.), or fabric surfaces, e.g., knit, woven, and non-woven surfaces (such as surgical garments, draperies, bed linens, bandages, etc.), or patient-care equipment (such as respirators, diagnostic equipment, shunts, body scopes, wheel chairs, beds, etc.), or surgical and diagnostic equipment. Health care surfaces include articles and surfaces employed in animal health care.

As used herein, the term "instrument" refers to the various medical or dental instruments or devices that can benefit from cleaning with a stabilized composition according to the present invention.

As used herein, the phrases "medical instrument", "dental instrument", "medical device", "dental device", "medical equipment", or "dental equipment" refer to instruments, devices, tools, appliances, apparatus, and equipment used in medicine or dentistry. Such instruments, devices, and equipment can be cold sterilized, soaked or washed and then heat sterilized, or otherwise benefit from cleaning in a composition of the present invention. These various instruments, devices and equipment include, but are not limited to: diagnostic instruments, trays, pans, holders, racks, forceps, scissors, shears, saws (e.g. bone saws and their blades), hemostats, knives, chisels, rongeurs, files, nippers, drills, drill bits, rasps, burrs, spreaders, breakers, elevators, clamps, needle holders, carriers, clips, hooks, gouges, curettes, retractors, straightener, punches, extractors, scoops, keratomes, spatulas, expressors, trocars, dilators, cages, glassware, tubing, catheters, cannulas, plugs, stents, scopes (e.g., endoscopes, stethoscopes, and arthoscopes) and related equipment, and the like, or combinations thereof.

As used herein, a solid cleaning composition refers to a cleaning composition in the form of a solid such as a powder, a flake, a granule, a pellet, a tablet, a lozenge, a puck, a briquette, a brick, a solid block, a unit dose, or another solid form known to those of skill in the art. The term "solid" refers to the state of the detergent composition under the expected conditions of storage and use of the solid detergent composition. In general, it is expected that the detergent composition will remain in solid form when exposed to temperatures of up to about 100° F. and greater than about 120° F.

By the term "solid" as used to describe the processed composition, it is meant that the hardened composition will not flow perceptibly and will substantially retain its shape under moderate stress or pressure or mere gravity, as for example, the shape of a mold when removed from the mold, the shape of an article as formed upon extrusion from an extruder, and the like. The degree of hardness of the solid cast composition can range from that of a fused solid block which is relatively dense and hard, for example, like concrete, to a consistency characterized as being malleable and sponge-like, similar to caulking material.

As used herein, the term "organic component used in cell culture media" refers to sugars (e.g., glucose or dextrose), amino acids, vitamins, cofactors, pyruvate, organic buffers, fatty acids, and nucleosides that are employed in cell culture media to nourish cells and provide them energy for growth. The ATCC (American Type Culture Collection) catalog lists cell culture media including Dulbecco's Modified Eagle's Medium (DMEM), variants of DMEM (e.g., ES-DMEM, DMEM: F12 medium), Eagle's Minimum Essential Medium (EMEM), F-12K Medium, Hybri-Care Medium, Iscove's Modified Dulbecco's Medium (IMDM), Leibovitz's L-15 Medium, McCoy's 5A Medium, RPMI-1640 Medium and provides lists of ingredients and the amounts of ingredients in these media. These media are standards whose contents are known. The content of these media is hereby incorporated by reference. In an embodiment, the present composition if substantially free of any organic component of cell culture media. In an embodiment, the present composition is free of any organic component of cell culture media.

As used herein, weight percent (wt-%), percent by weight, % by weight, and the like are synonyms that refer to the concentration of a substance as the weight of that substance divided by the total weight of the composition and multiplied by 100.

As used herein, the term "about" modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about", the claims include equivalents to the quantities.

Exhausted Threshold Agent

The present inventors have unexpectedly discovered that compositions including a mixture of hardness ions in an amount greater than the amount of threshold agent have a beneficial effect on etch or corrosion during cleaning of, for example, articles of glass or aluminum. The compositions can even synergistically reduce etch or corrosion or etch of glass and aluminum. The synergistic compositions include defined ratios of water soluble calcium salt, water soluble magnesium salt, and threshold agent. For example, a ratio of magnesium ions to calcium ions to threshold inhibitor effective for synergistically reducing the level of glass etching is about 3-7:1-4:1-4. By way of further example, a ratio of magnesium ions to calcium ions to threshold inhibitor effective for synergistically reducing the level of aluminum etching is about 4-25:4-5:0.5-2. This synergy and ratios of ingredients that achieve it are described further herein below.

Unexpectedly, the present inventors found that, in an embodiment, certain ratios of magnesium to calcium to threshold agent in the cleaning composition provided an "exhausted threshold agent" that protected glass and aluminum from etching, for example, in the presence of alkaline warewash detergent. Threshold agents are normally used in cleaning compositions to inhibit the precipitation of hard water scale from water during cleaning. The present invention incorporates water hardness ions (e.g., magnesium and calcium ions) and threshold agent together in a cleaning composition, which, in effect, ruins the threshold agent for its intended purpose.

The compositions of the present invention can include ratios of magnesium ion to calcium ion to threshold inhibitor effective to reduce corrosion or etching of glass or aluminum. For example, the water soluble magnesium salt and the water soluble calcium salt can be present in an amount sufficient to exceed the threshold capacity of the threshold agent. In an embodiment, the water soluble magnesium salt to the water soluble calcium salt is greater than or equal to about 1:1 (wt:wt). In an embodiment, the water soluble calcium salt is present in an amount greater than or equal to about 0.5*threshold agent (wt:wt).

The ratio of hardness ions (e.g., magnesium and calcium ions) to threshold agent can be varied for reducing the corrosion of a particular material. For example, the ratio of hardness ions (e.g., magnesium and calcium ions) to threshold agent can be selected to provide advantageous reduction in corrosion or etching of glass. For example, the ratio of hardness ions (e.g., magnesium and calcium ions) to threshold agent can be selected to provide advantageous reduction in corrosion or etching of aluminum.

In an embodiment, ratios effective for reducing the level of glass etching include a ratio of magnesium ions to threshold inhibitor of greater than about 1:1 and a ratio of calcium ions to threshold inhibitor greater than or equal to about 1:1. In an embodiment, the ratio of magnesium ions to calcium ions to threshold inhibitor effective for synergistically reducing the level of glass etching is about 3-7:1-4:1-4. In an embodiment, the ratio of magnesium ions to calcium ions to threshold inhibitor effective for synergistically reducing the level of glass etching is about 5:1-2.5:1-2.5. In an embodiment, the ratio of magnesium ions to calcium ions to threshold inhibitor effective for synergistically reducing the level of glass etching is about 5:2.5:2.5. In an embodiment, the ratio of magnesium ions to calcium ions to threshold inhibitor effective for synergistically reducing the level of glass etching is about 3-7:1-4:0.5-1.92. In an embodiment, the ratio of magnesium ions to calcium ions to threshold inhibitor effective for synergistically reducing the level of glass etching is about 5:1-2.5:0.5-1.2. In an embodiment, the ratio of magnesium ions to calcium ions to threshold inhibitor effective for synergistically reducing the level of glass etching is about 5:2.5:1.2. These ratios are based on experimental data discussed below in the Examples.

In an embodiment, the ratio of magnesium ions to calcium ions effective for reducing the level of aluminum etching is greater than or equal to about 1:1. In an embodiment, the ratio of magnesium ions to active threshold inhibitor effective for reducing the level of aluminum etching is greater than about 2:1. In an embodiment, the ratio of magnesium ions to active threshold inhibitor effective for reducing the level of aluminum etching is greater than about 2:0.5. In an embodiment, the ratio of magnesium ions to calcium ions to threshold inhibitor effective for synergistically reducing the level of aluminum etching is about 4-25:4-5:0.5-2. In an embodiment, the ratio of magnesium ions to calcium ions to threshold inhibitor effective for synergistically reducing the level of aluminum etching is about 4:4:1. In an embodiment, the ratio of magnesium ions to calcium ions to threshold inhibitor effective for synergistically reducing the level of aluminum etching is about 4-25:4-5:0.24-0.96. In an embodiment, the ratio of magnesium ions to calcium ions to threshold inhibitor effective for synergistically reducing the level of aluminum etching is about 4:4:0.5. These ratios are based on experimental data discussed below in the Examples.

Various combinations of water soluble magnesium salt, water soluble calcium salt, and water soluble threshold agent were evaluated as protectants for glass and aluminum as described in the Examples. The data clearly shows synergistic ratios of the three components which was synergistic, using as the definition of synergy a performance better than any individual component, and which also protected better than any binary combination of components, including the calcium threshold agent system known to be a corrosion inhibitor.

In certain embodiments, the present composition includes about 1 to about 80 wt-% source of hardness ions and about 20 to about 99 wt-% threshold agent; about 3 to about 60 wt-% source of hardness ions and about 40 to about 97 wt-% threshold agent; or about 5 to about 30 wt-% source of hardness ions and about 70 to about 95 wt-% threshold agent.

In certain embodiments, the present exhausted threshold agent composition includes about 1 to about 80 wt-% water soluble calcium salt and water soluble magnesium salt and about 20 to about 99 wt-% threshold agent; about 3 to about 60 wt-% water soluble calcium salt and water soluble magnesium salt and about 40 to about 97 wt-% threshold agent; or about 5 to about 30 wt-% water soluble calcium salt and water soluble magnesium salt and about 70 to about 95 wt-% threshold agent.

The present corrosion inhibitor can include only water soluble calcium salt, water soluble magnesium salt, and threshold agent in the amounts and ratios listed in Tables A and B. Alternatively, the present corrosion inhibitor can be part of a composition that also includes additional ingredient (s), in which case the amounts of ingredients selected from Table B need not add up to 100 wt-%, the remainder can be any additional ingredient(s). The present invention also includes the amounts and ranges stated in the tables modified by the word "about".

The present invention relates to a cleaning composition including the present corrosion inhibitor composition and to methods employing the cleaning composition. This composition can include surfactant, alkalinity source, and sufficient water soluble magnesium salt, water soluble calcium salt, and water soluble threshold agent to provide corrosion/etch resistance without scale formation in the use solution. The present cleaning composition can include surfactant, alkalinity source and the present corrosion inhibitor in amounts shown in Table A.

TABLE A

| Concentrate Cleaning Composition by Wt-% | | | | |
|---|---|---|---|---|
| Surfactant | 0.1-20 | 1-15 | 2-10 | 3-8 |
| Alkalinity Source | 0.1-70 | 1-50 | 2-40 | 5-30 |
| The Corrosion Inhibitor | 0.01-20 | 0.1-15 | 0.2-10 | 0.3-8 |

The corrosion inhibitor can be used in any application where it is desirable to reduce surface corrosion, such as in a detergent composition. The present invention also includes the amounts and ranges stated in the tables modified by the word "about".

In an embodiment, the present invention relates to a composition and it's use for corrosion and/or etch control which is substantially free of (or even free of) common detergent components. In an embodiment, the present corrosion inhibitor provided substantially free of (or even free of) surfactant, alkalinity source, or builder. This composition can include sufficient water soluble magnesium salt, water soluble calcium salt, and water soluble threshold agent to provide corrosion/etch resistance without scale formation in the use solution. Such a corrosion inhibitor composition can be employed alone or, at the locus of use, the corrosion inhibitor or use composition of the corrosion inhibitor can be employed or combined with a separate cleaning composition known to those skilled in the art.

In certain embodiments, the present composition consists essentially of water soluble magnesium salt, water soluble calcium salt, and threshold agent. As used herein, the phrases "consisting essentially of" or "consists essentially of" refer to a composition including the listed ingredients (e.g., water soluble magnesium salt, water soluble calcium salt, and threshold agent) but lacking an effective amount of any cleaning component commonly used in cleaning compositions.

In an embodiment, the present composition is free of cleaning components commonly used in cleaning compositions. As used herein, the phrase "free of cleaning components commonly used in cleaning compositions" refers to a composition, mixture, or ingredient that does not contain a cleaning component commonly used in cleaning compositions or to which a cleaning component commonly used in a cleaning composition has not been added. Should a cleaning component commonly used in cleaning compositions be present through contamination of a composition free of cleaning components commonly used in cleaning, the amount of cleaning component commonly used in cleaning compositions shall be less than 0.5 wt %. In an embodiment, the amount of cleaning component commonly used in cleaning compositions is less then 0.1 wt-%. In an embodiment, the amount of cleaning component commonly used in cleaning compositions is less than 0.01 wt %.

As used herein, "cleaning component commonly used in cleaning compositions" refers to: source of alkalinity, organic surfactant or cleaning agent (e.g., surfactant or surfactant system, e.g., anionic, nonionic, cationic, and zwitterionic surfactant), pH modifier (e.g., organic or inorganic source of alkalinity or a pH buffering agent), builder (e.g., inorganic builder such as silicate, carbonate, sulfate, salt or acid form thereof), processing aid, active oxygen compound, glass or metal corrosion inhibitor, activator, rinse aid functional material, bleaching agent, defoaming agent, anti-redeposition agent, stabilizing agent, enzyme, chelating agent or sequestrant (e.g., phosphonate, phosphate, aminocarboxylate, polycarboxylate, and the like), detersive polymer, softener, source of acidity, solubility modifier, bleaching agent or additional bleaching agent, effervescent agent, and activator for the source of alkalinity.

The water soluble magnesium salt, water soluble calcium salt, and water soluble threshold agent are sufficiently water-soluble so that when the composition is combined with a diluent, such as water, the compounds dissolve. In this context, sufficiently water-soluble means that the salts dissolve at a relatively quick rate in water. In an embodiment, the solubility of the water soluble magnesium salt, water soluble calcium salt, and water soluble threshold agent is at least about 0.5 wt-% in water at about 20° C. and atmospheric pressure. In an embodiment, the water soluble magnesium salt, water soluble calcium salt, and water soluble threshold agent remain soluble in solution. In an embodiment, the water soluble magnesium salt, water soluble calcium salt, and water soluble threshold agent remain dispersed in solution. In an embodiment, once solubilized, the water soluble magnesium salt, water soluble calcium salt, and water soluble threshold agent interact to form a salt having limited water solubility (e.g., even water insoluble). In this context, the phrase "limited water solubility" means that the salt has a tendency to precipitate from the solution. In an embodiment, a salt having limited water solubility has a solubility of less than about 0.5 wt-% in water at about 20° C. and atmospheric pressure.

The water-insoluble salt may be formed in-situ when the diluent is added to the present composition or may be added to a liquid as a premade complex. Forming the water insoluble salt in situ can result in its more homogeneous dispersion in solution. Forming the water insoluble salt as a premade complex can allow use of lower concentrations while achieving the same level of effectiveness as forming the corrosion inhibitor in situ.

Theories of Operation

Although not limiting to the present invention, it is believed that, in certain embodiments, a salt formed from the hardness ions (e.g., magnesium and calcium) and the threshold agent forms a microscopic protective film on the surface of articles exposed to the present composition. The protective film can be transparent or not visible to the unaided eye. Such as film can function as a protective layer to slow or prevent other components that may be present in solution from attacking and corroding the surface of the article. Thus, the film functions as a sacrificial layer and allows other components such as alkalinity sources, builders, or sequestrants, to attack and remove portions of the film, rather than attack the surface of the article. A relatively thin film that may be easily removed from the surface during subsequent cleaning so that a new film may be deposited on the surface to provide a new protective layer. Thus, it does not permanently build up on the surface and form an iridescent film or surface cloudiness. As a result, the precipitate film is available to protect the surface but can be removed and regenerated.

Although not limiting to the present invention, it is believed that, in certain embodiments, the corrosion inhibitor protects the surface by replacing ions extracted from the surface by an alkalinity source or builder in solution and/or by annealing the surface to remove surface hydroxyl groups. The protective film can degrades during subsequent wash cycles and can be continually regenerated as a result of precipitation of the salt Although not limiting to the present invention, it is believed that, in certain embodiments, the rate of deposition of the salt is largely dependent on the ratio of cations to anions provided in the present composition. It is believed that the ratio of cations to anions may be manipulated such that the film deposited onto the surface is thick enough to protect against etching but is thin enough that it is relatively transparent and/or and substantially invisible to the naked eye such as by an individual casually inspecting the glass in normal use situations (e.g., at a dinner table). In selecting the ratio of cations to anions, numerous factors can be considered, including, but not limited to: the hardness level of the water, the cation source, the threshold agent, and the material of the surface to be protected.

Although not limiting to the present invention, it is believed that, in certain embodiments, it is believed that magnesium ions moderate the precipitation/film formation of calcium threshold agent such that the protection layer does not build-up to the extent to which it is visible to the unaided eye, i.e. does not build-up as scale.

Water Soluble Magnesium Salts

Suitable water soluble magnesium compounds include those selected from the group consisting of magnesium acetate, magnesium benzoate, magnesium bromide, magnesium bromate, magnesium chlorate, magnesium chloride, magnesium chromate, magnesium citrate, magnesium formate, magnesium hexafluorosilicate, magnesium iodate, magnesium iodide, magnesium lactate, magnesium molybdate, magnesium nitrate, magnesium perchlorate, magnesium phosphinate, magnesium salicylate, magnesium sulfate, magnesium sulfite, magnesium thiosulfate, a hydrate thereof, and a mixture thereof. These salts can be provided as hydrated salts or anhydrous salts.

Water soluble magnesium compounds approved as GRAS for direct food contact include magnesium chloride and magnesium sulfate.

Water Soluble Calcium Salts

Suitable water soluble calcium salts include those selected from the group consisting of calcium acetate, calcium benzoate, calcium bromate, calcium bromide, calcium chlorate, calcium chloride, calcium chromate, calcium dihydrogen phosphate, calcium dithionate, calcium formate, calcium gluconate, calcium glycerophosphate, calcium hydrogen sulfide, calcium iodide, calcium lactate, calcium metasilicate, calcium nitrate, calcium nitrite, calcium pantothenate, calcium perchlorate, calcium permanganate, calcium phosphate, calcium phosphinate, calcium salicylate, calcium succinate, a hydrate thereof, and a mixture thereof. These salts can be provided as hydrated compounds or anhydrous compounds.

Threshold Agents

Suitable threshold inhibitors include: polyacrylates and their copolymers, polymethacrylates and their copolymers, polyacrylamides and their copolymers, maleic/olefin polymers, polycarboxylates and their copolymers, and organophosphonates. In an embodiment, end group functionalities (sulfate groups, sulfonate groups, phosphate groups, carboxylate groups) may also be added to modify water solubility of the polymers. A suitable polyacrylate is a sodium polyacrylate copolymer.

Polymeric polycarboxylates suitable for use as threshold inhibitors have pendant carboxylate groups and include, for example, polyacrylic acid, maleic/olefin copolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, hydrolyzed acrylonitrile-methacrylonitrile copolymers, and the like.

Examples of suitable phosphonates include, but are not limited to: 1-hydroxyethane-1,1-diphosphonic acid $CH_3C(OH)[PO(OH)_2]_2$; aminotri(methylenephosphonic acid) $N[CH_2PO(OH)_2]_3$; aminotri(methylenephosphonate); 2-hydroxyethyliminobis(methylenephosphonic acid) $HOCH_2CH_2N[CH_2PO(OH)_2]_2$; diethylenetriaminepenta(methylenephosphonic acid) $(HO)_2POCH_2N[CH_2CH_2N[CH_2PO(OH)_2]_2]_2$; diethylenetriaminepenta(methylenephosphonate), sodium salt $C_9H_{(28-x)}N_3Na_xO_{15}P_5$ (x=7); hexamethylenediamine(tetramethylenephosphonate), potassium salt $C_{10}H_{(28-x)}N_2K_xO_{12}P_4$ (x=6); bis(hexamethylene)triamine(pentamethylenephosphonic acid) $(HO_2)POCH_2N[(CH_2)_6N[CH_2PO(OH)_2]_2]_2$; and phosphorus acid $H_3PO_3$. A particular phosphonate combination is ATMP and DTPMP. A neutralized or alkaline phosphonate, or a combination of the phosphonate with an alkali source prior to being added into the mixture such that there is little or no heat or gas generated by a neutralization reaction when the phosphonate is added is particularly suitable.

Examples of suitable commercially available threshold inhibitors include: Acusol 445N, Acusol 588, Acusol 455, Acusol 420NG, Acusol 445ND, Acusol 445NG, Acusol 460NK, and Acusol 497NG, all available from Rohm & Haas, Philadelphia, Pa.; and Briquest 301-50A, Briquest ADPA 60A, Briquest 422-25S, Briquest 422-34CS, Briquest 301-50A, Briquest 543-45AS, Briquest ADPA-60A, Briquest 543-25S, Briquest ADPA-20AS, Briquest ADPA-21SH, Briquest 221-50A, Briquest 301-50A, Briquest 462-23K, Briquest 5123-29S, Briquest 543-50A, and Briquest 5123-50A, all available from Rhodia, Baltimore, Md.

Examples of oligomeric or polymeric polycarboxylates suitable as threshold agents include: oligomaleic acids as described, for example, in EP-A-451 508 and EP-A-396 303; co- and terpolymers of unsaturated $C_4$-$C_8$-dicarboxylic acids, possible co-monomers which may be present being monoethylenically unsaturated monomers from group (i) in amounts of up to 95% by weight, from group (ii) in amounts of up to 60% by weight, from group (iii) in amounts of up to 20% by weight. Examples of suitable unsaturated $C_4$-$C_8$-dicarboxylic acids include maleic acid, fumaric acid, itaconic acid and citraconic acid.

The group (i) includes monoethylenically unsaturated $C_3$-$C_8$-monocarboxylic acids, such as acrylic acid, methacrylic acid, crotonic acid and vinylacetic acid, for example acrylic acid and methacrylic acid. Group (ii) includes monoethylenically unsaturated $C_2$-$C_{22}$-olefins, vinyl alkyl ethers with $C_1$-$C_8$-alkyl groups, styrene, vinyl esters of $C_1$-$C_8$-carboxylic acids, (meth)acrylamide and vinylpyrrolidone, for example $C_2$-$C_6$-olefins, vinyl alkyl ethers with $C_1$-$C_4$-alkyl groups, vinyl acetate and vinyl propionate. Group (iii) includes (meth)acrylic esters of $C_1$-$C_8$-alcohols, (meth)acrylnitrile, (meth)acrylamides of $C_1$-$C_8$-amines, N-vinylformamide and vinylimidazole.

If the polymers contain vinyl esters as monomers of group (ii) these can also be partially or completely hydrolyzed to vinyl alcohol structural units. Suitable co- and terpolymers are disclosed, for example, in U.S. Pat. No. 3,887,806 and DE-A 43 13 909.

Suitable copolymers of dicarboxylic acids include copolymers of maleic acid and acrylic acid in the ratio of 10:90 to 95:5 by weight. These can have a ratio of from 30:70 to 90:10 by weight, with molecular weights of from 10,000 to 150,000. Terpolymers of maleic acid, acrylic acid and a vinyl ester of a $C_1$-$C_3$-carboxylic acid can be employed with the ratio of from 10 (maleic acid):90 (acrylic acid+vinyl ester) to 95 (maleic acid):5 (acrylic acid+vinyl ester) by weight, for example, with the ratio of acrylic acid to vinyl ester in the range from 20:80 to 80:20 by weight. By way of further example, terpolymers of maleic acid, acrylic acid and vinyl acetate or vinyl propionate can have the ratio of from 20 (maleic acid):80 (acrylic acid+vinyl ester) to 90 (maleic acid): 10 (acrylic acid+vinyl ester) by weight, for example, with the ratio of acrylic acid to the vinyl ester in the range from 30:70 to 70:30 by weight. Additional copolymers of maleic acid with $C_2$-$C_8$-olefins have the molar ratio from 40:60 to 80:20 for, for example, copolymers of maleic acid with ethylene, propylene or isobutene in the molar ratio 50:50.

Graft polymers of unsaturated carboxylic acids on low molecular weight carbohydrates or hydrogenated carbohydrates can be employed as polycarboxylate threshold agents. Such graft polymers are described in, for example, U.S. Pat. No. 5,227,446, DE-A-44 15 623, DE-A-43 13 909. Suitable unsaturated carboxylic acids for graft polymers include, for example, maleic acid, fumaric acid, itaconic acid, citraconic acid, acrylic acid, methacrylic acid, crotonic acid and vinylacetic acid, and mixtures of acrylic acid and maleic acid, which are grafted on in amounts of from 40 to 95% of the weight of the component to be grafted. It is additionally possible for up to 30% by weight, based on the component to be grafted, of other monoethylenically unsaturated monomers to be present for modification. Suitable modifying monomers include the abovementioned monomers of groups (ii) and (iii).

Suitable grafting bases include degraded polysaccharides, such as acidically or enzymatically degraded starches, inulins or cellulose, reduced (hydrogenated or reductively aminated) degraded polysaccharides, such as mannitol, sorbitol, aminosorbitol and glucamine, and polyalkylene glycols with molecular weights of up to 5,000 such as polyethylene glycols, ethylene oxide/propylene oxide or ethylene oxide/butylene oxide block copolymers, random ethylene oxide/propylene oxide or ethylene oxide/butylene oxide copolymers, alkoxylated mono- or polyhydric $C_1$-$C_{22}$-alcohols, see U.S. Pat. No. 4,746,456.

Suitable graft polymers include grafted degraded or degraded reduced starches and grafted polyethylene oxides, employing from 20 to 80% by weight of monomers, based on the grafting component, in the graft polymerization. These can include a mixture of maleic acid and acrylic acid in the ratio of from 90:10 to 10:90 by weight for grafting.

Polyglyoxylic acids suitable as threshold agents are described, for example, in EP-B-001 004, U.S. Pat. No.

5,399,286, DE-A-41 06 355 and EP-A-656 914. The end groups of the polyglyoxylic acids may have various structures.

Polyamidocarboxylic acids and modified polyamidocarboxylic acids suitable as threshold agents are disclosed, for example, in EP-A-454 126, EP-B-511 037, WO 94/01486 and EP-A-581 452.

Additional suitable threshold agents include polyaspartic acid or cocondensates of aspartic acid with other amino acids, $C_4$-$C_{25}$-mono- or -dicarboxylic acids and/or $C_4$-$C_{25}$-mono- or -diamines. Polyaspartic acids prepared in phosphorus-containing acids and modified with $C_6$-$C_{22}$-mono- or -dicarboxylic acids or with $C_6$-$C_{22}$-mono- or -diamines are particularly preferably employed.

Condensation products of citric acid with hydroxy carboxylic acids or polyhydroxy compounds which are suitable as organic cothreshold agents are disclosed, for example, in WO 93/22362 and WO 92/16493. Carboxyl-containing condensates of this type normally have molecular weights of up to 10,000, preferably up to 5,000.

In an embodiment, the threshold agent is selected from the group consisting of a polyacrylate, a polymethacrylate, a maleic/olefinic polymer, a copolymer thereof, and a mixture thereof.

Water

Water can be hard water, city water, well water, water supplied by a municipal water system, water supplied by a private water system, treated water, or water directly from the system or well. In general, hard water refers to water having a level of calcium and magnesium ions in excess of about 100 ppm. Often, the molar ratio of calcium to magnesium in hard water is about 2:1 or about 3:1. Although most locations have hard water, water hardness tends to vary from one location to another. Water can be potable water as obtained from a municipal or private water system, e.g., a public water supply or a well.

Embodiments of the Present Compositions

The present exhausted threshold agent composition can be provided in any of a variety of embodiments of compositions. For example, the exhausted threshold agent composition can be a component of a cleaning composition. Such a cleaning composition can include exhausted threshold agent composition, surfactant, and alkalinity source.

In an embodiment, the present composition is substantially free of zinc. In general, the present composition can be characterized as substantially free of zinc if the corrosion inhibitor contains no intentionally added zinc. For example, the present composition may be characterized as substantially free of zinc if it contains no zinc, or if zinc is present, the amount of zinc is less than about 0.01 wt-%. Zinc can unnecessarily consume certain builders or chelating agents, which is a reason to exclude it.

In an embodiment, the present composition does not include phosphorus or nitrilotriacetic acid (NTA) containing compounds. Phosphorus-free refers to a composition, mixture, or ingredients to which phosphorus-containing compounds are not added. Should phosphorus-containing compounds be present, the level of phosphorus-containing compounds in the resulting composition should be less than about 1 wt-%, less than about 0.5 wt-%, less than about 0.1 wt-%, or less than about 0.01 wt-%. NTA-free refers to a composition, mixture, or ingredients to which NTA-containing compounds are not added. Should NTA-containing compounds be present, the level of NTA in the resulting composition should be less than about 1 wt-%, less than about 0.5 wt-%, less than about 0.1 wt-%, or less than about 0.01 wt-%. When the detergent composition is NTA-free, the detergent composition is also compatible with chlorine, which functions as an anti-redeposition and stain-removal agent.

In an embodiment, the present composition includes a source of hardness ions (e.g., magnesium and calcium ions) and a threshold agent that are characterized by the United States Food and Drug Administration as direct or indirect food additives.

Warewashing Composition

The present exhausted threshold agent composition can be employed as a component of a warewashing composition. Warewashing can etch wares made of, for example, aluminum, glass, ceramic, or porcelain. Table D describes ingredients for suitable warewashing compositions. The present invention also includes the amounts and ranges stated in the tables modified by the word "about".

TABLE D

Warewashing Compositions

| Ingredient | Warewashing Composition 1 (wt-%) | Warewashing Composition 2 (wt-%) |
| --- | --- | --- |
| Exhausted threshold agent Composition | 0.01-20 | 0.1-10 |
| alkaline source | 5-60 | 10-50 |
| surfactant | 0.05-20 | 0.5-15 |
| builder | 1-60 | 3-50 |
| water | 0.1-60 | |
| Optional Ingredients: | | |
| bleaching agent | 0.1-60 | 1-20 |
| filler | 1-20 | 3-15 |
| defoaming agent | 0.01-3 | 0.1-2 |
| anti-deposition agent | 0.5-10 | 1-5 |
| stabilizing agent | 0.5-15 | 2-10 |
| dispersant | 0.5-15 | 2-9 |
| enzyme | 0.5-10 | 1-5 |

The present composition can be a warewashing composition. The warewashing detergent composition includes a cleaning agent, an alkaline source, and a corrosion inhibitor. The cleaning agent comprises a detersive amount of a surfactant. The alkaline source is provided in an amount effect to provide a use composition having a pH of at least about 8 when measured at a concentration of about 0.5 wt. %. The corrosion inhibitor can be provided in an amount sufficient for reducing corrosion of glass, porcelain, ceramic, or aluminum when the warewashing detergent composition is combined with water of dilution at a dilution ratio of dilution water to detergent composition of at least about 20:1. A method for using a warewashing detergent composition is provided according to the invention. The method includes steps of diluting the warewashing detergent composition with water of dilution at a ratio of water dilution to warewashing detergent composition of at least about 20:1, and washing glass with the use composition in an automatic dishwashing machine.

The warewashing composition, can be available for cleaning in environments other than inside an automatic dishwashing or warewashing machine. For example, the composition can be used as a pot and pan cleaner for cleaning glass, dishes, etc. in a sink. The warewashing composition includes an effective amount of a corrosion inhibitor to provide a use composition exhibiting resistance to glass corrosion. The phrase "effective amount" in reference to the corrosion inhibitor refers to an amount sufficient to provide a use composition exhibiting reduced glass corrosion compared with a composition that is identical except that it does not contain a sufficient amount of the corrosion inhibitor to reduce corrosion of glass after multiple washings.

The warewashing composition prior to dilution to provide the use composition can be referred to as the warewashing composition concentrate or more simply as the concentrate. The concentrate can be provided in various forms including as a liquid or as a solid. Pastes and gels can be considered types of liquid. Powders, agglomerates, pellets, tablets, and blocks can be considered types of solid.

Hard Surface Cleaner

The present exhausted threshold agent composition can be employed as a component of a hard surface cleaning composition. Hard surface cleaners can etch objects made of, for example, aluminum or glass. Table E describes ingredients for suitable hard surface cleaners. The present invention also includes the amounts and ranges stated in the tables modified by the word "about".

TABLE E

Hard Surface Cleaning Compositions

| Ingredient | Hard Surface Cleaner 1 (wt-%) | Hard Surface Cleaner 2 (wt-%) | Hard Surface Cleaner 3 (wt-%) |
|---|---|---|---|
| Exhausted threshold agent Composition | 0.01-20 | 0.1-10 | 0.2-8 |
| nonionic surfactant | 0.01-20 | 0.1-15 | 0.5-8 |
| Optional Ingredients: | | | |
| anionic surfactant | 0-20 | 0.1-15 | 0.5-8 |
| amphoteric surfactant | 0-10 | 0.1-8 | 0.5-5 |
| non-phosphorus containing builder | 0.01-30 | 0.1-25 | 1-15 |
| anti-redeposition agent | 0-10 | 0.1-8 | 0.3-5 |
| alkalinity source | 0.1-30 | 0.5-25 | 1-15 |
| thickener | 0-5 | 0.1-4 | 0.5-3 |
| organic solvent | 0-20 | 0.1-15 | 0.5-10 |
| antimicrobial agent | 0-20 | 0.01-15 | 0.03-10 |
| solidification agent | 5-90 | 10-80 | 20-60 |
| water | balance | balance | balance |

| Ingredient | Hard Surface Cleaner 4 (wt-%) | Hard Surface Cleaner 5 (wt-%) | Hard Surface Cleaner 6 (wt-%) |
|---|---|---|---|
| Exhausted threshold agent Composition | 0.3-6 | 0.4-5 | 0.5-4 |
| nonionic surfactant | 0.01-20 | 0.1-15 | 0.5-8 |
| Optional Ingredients: | | | |
| anionic surfactant | 0-20 | 0.1-15 | 0.5-8 |
| amphoteric surfactant | 0-10 | 0.1-8 | 0.5-5 |
| non-P containing builder | 0.01-30 | 0.1-25 | 1-15 |
| anti-redeposition agent | 0-10 | 0.1-8 | 0.3-5 |
| alkalinity source | 0.1-30 | 0.5-25 | 1-15 |
| thickener | 0-5 | 0.1-4 | 0.5-3 |
| organic solvent | 0-20 | 0.1-15 | 0.5-10 |
| antimicrobial agent | 0-20 | 0.01-15 | 0.03-10 |
| water | balance | balance | balance |

A hard surface cleaner can be configured to be diluted with water to provide a use composition that can be used to clean hard surfaces. Examples of hard surfaces include, but are not limited to: architectural surfaces such as walls, showers, floors, sinks, mirrors, windows, and countertops; transportation vehicles such as cars, trucks, buses, trains, and planes; surgical or dental instruments; food processing equipment; and washing equipment such as dishwashers or laundry machines.

Solid Cleaning Compositions

The present exhausted threshold agent composition can be employed as a component of a solid cleaning composition. Solid cleaning composition can etch objects made of, for example, aluminum, glass, ceramic, or porcelain. Table F describes ingredients for solid cleaning compositions. The present invention also includes the amounts and ranges stated in the tables modified by the word "about".

TABLE F

Solid Cleaning Compositions

| Ingredient | Solid Cleaning Composition 1 (wt-%) | Solid Cleaning Composition 2 (wt-%) |
|---|---|---|
| Exhausted threshold agent Composition | 0.01-20 | 0.1-10 |
| Surfactant | 0.1-40 | 1-20 |
| alkaline source | 10-80 | 15-70 |
| solidifying agent | 0.1-80 | 1-60 |
| water | 0-50 | 0.1-30 |
| binding agent | 0.1-80 | 1-60 |

Additional Ingredients

Solid cleaning compositions made according to the invention may further include additional functional materials or additives that provide a beneficial property, for example, to the composition in solid form or when dispersed or dissolved in an aqueous solution, e.g., for a particular use. Examples of conventional additives include one or more of each of polymer, surfactant, secondary hardening agent, solubility modifier, detergent filler, defoamer, anti-redeposition agent, antimicrobial, aesthetic enhancing agent (i.e., dye, odorant, perfume), optical brightener, bleaching agent or additional bleaching agent, enzyme, effervescent agent, activator for the source of alkalinity, and mixtures thereof.

Builder

In an embodiment, the present composition includes a builder that is incapable of chelating a significant amount of or any of the magnesium. Zeolite 3A is an example of this type of builder. A purpose of such builder can be to increase the molar ratio of Mg/Ca in the use solution. This can reduce the amount of magnesium compound used as an ingredient in the solid composition.

Organic Surfactants or Cleaning Agents

The composition can include at least one cleaning agent which can be a surfactant or surfactant system. A variety of surfactants can be used in a cleaning composition, including anionic, nonionic, cationic, and zwitterionic surfactants, which are commercially available from a number of sources. Suitable surfactants include nonionic surfactants. Suitable nonionic surfactants include low foaming non-ionic surfactants. For a discussion of surfactants, see Kirk-Othmer, *Encyclopedia of Chemical Technology*, Third Edition, volume 8, pages 900-912.

Nonionic surfactants are useful in the present solid compositions, include those having a polyalkylene oxide polymer as a portion of the surfactant molecule. Such nonionic surfactants include, for example, chlorine-, benzyl-, methyl-, ethyl-, propyl-, butyl- and other like alkyl-capped polyethylene and/or polypropylene glycol ethers of fatty alcohols; polyalkylene oxide free nonionics such as alkyl polyglycosides; sorbitan and sucrose esters and their ethoxylates; alkoxylated ethylene diamine; carboxylic acid esters such as glycerol esters, polyoxyethylene esters, ethoxylated and glycol esters of fatty acids, and the like; carboxylic amides such as diethanolamine condensates, monoalkanolamine condensates, polyoxyethylene fatty acid amides, and the like; and ethoxylated amines and ether amines commercially available from Tomah Corporation and other like nonionic compounds. Silicone surfactants such as the ABIL B8852 (Goldschmidt) can also be used.

Additional suitable nonionic surfactants having a polyalkylene oxide polymer portion include nonionic surfactants of C6-C24 alcohol ethoxylates (e.g., C6-C14 alcohol ethoxylates) having 1 to about 20 ethylene oxide groups (e.g., about 9 to about 20 ethylene oxide groups); C6-C24 alkylphenol ethoxylates (e.g., C8-C10 alkylphenol ethoxylates) having 1 to about 100 ethylene oxide groups (e.g., about 12 to about 20 ethylene oxide groups); C6-C24 alkylpolyglycosides (e.g., C6-C20 alkylpolyglycosides) having 1 to about 20 glycoside groups (e.g., about 9 to about 20 glycoside groups); C6-C24 fatty acid ester ethoxylates, propoxylates or glycerides; and C4-C24 mono or dialkanolamides.

Specific alcohol alkoxylates include alcohol ethoxylate propoxylates, alcohol propoxylates, alcohol propoxylate ethoxylate propoxylates, alcohol ethoxylate butoxylates, and the like; nonylphenol ethoxylate, polyoxyethylene glycol ethers and the like; and polyalkylene oxide block copolymers including an ethylene oxide/propylene oxide block copolymer such as those commercially available under the trademark PLURONIC (BASF-Wyandotte), and the like.

Suitable nonionic surfactants include low foaming nonionic surfactants. Examples of suitable low foaming nonionic surfactants include secondary ethoxylates, such as those sold under the trade name TERGITOL™, such as TERGITOL™ 15-S-7 (Union Carbide), Tergitol 15-S-3, Tergitol 15-S-9 and the like. Other suitable classes of low foaming nonionic surfactant include alkyl or benzyl-capped polyoxyalkylene derivatives and polyoxyethylene/polyoxypropylene copolymers.

A useful nonionic surfactant for use as a defoamer is nonylphenol having an average of 12 moles of ethylene oxide condensed thereon, it being end capped with a hydrophobic portion comprising an average of 30 moles of propylene oxide. Silicon-containing defoamers are also well-known and can be employed in the compositions and methods of the present invention.

Suitable amphoteric surfactants include amine oxide compounds having the formula:

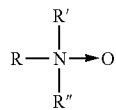

where R, R', R", and R'" are each a $C_1$-$C_{24}$ alkyl, aryl or aralkyl group that can optionally contain one or more P, O, S or N heteroatoms.

Another class of suitable amphoteric surfactants includes betaine compounds having the formula:

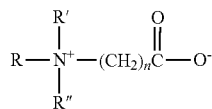

where R, R', R" and R'" are each a $C_1$-$C_{24}$ alkyl, aryl or aralkyl group that can optionally contain one or more P, O, S or N heteroatoms, and n is about 1 to about 10.

Suitable surfactants include food grade surfactants, linear alkylbenzene sulfonic acids and their salts, and ethylene oxide/propylene oxide derivatives sold under the Pluronic™ trade name. Suitable surfactants include those that are compatible as an indirect or direct food additive or substance; especially those described in the Code of Federal Regulations (CFR), Title 21—Food and Drugs, parts 170 to 186 (which is incorporated herein by reference).

Anionic surfactants suitable for the present cleaning compositions, include, for example, carboxylates such as alkylcarboxylates (carboxylic acid salts) and polyalkoxycarboxylates, alcohol ethoxylate carboxylates, nonylphenol ethoxylate carboxylates, and the like; sulfonates such as alkylsulfonates, alkylbenzenesulfonates, alkylarylsulfonates, sulfonated fatty acid esters, and the like; sulfates such as sulfated alcohols, sulfated alcohol ethoxylates, sulfated alkylphenols, alkylsulfates, sulfosuccinates, alkylether sulfates, and the like; and phosphate esters such as alkylphosphate esters, and the like. Suitable anionics include sodium alkylarylsulfonate, alpha-olefin sulfonate, and fatty alcohol sulfates. Examples of suitable anionic surfactants include sodium dodecylbenzene sulfonic acid, potassium laureth-7 sulfate, and sodium tetradecenyl sulfonate.

The surfactant can be present at amounts listed in the tables or about 0.01 to about 20 wt-% or about 0.1 to about 10 wt-%, about 0.2 to about 5 wt-%.

pH Modifier

The pH modifier can be an organic or inorganic source of alkalinity or a pH buffering agent. Nonlimiting examples include the alkali metal hydroxides, alkali metal carbonates, alkanolamines, salts of weak organic acids, etc. Suitable pH modifiers include sodium hydroxide, lithium hydroxide, potassium hydroxide, sodium carbonate, lithium carbonate, potassium carbonate, the corresponding bicarbonate or sesquicarbonate salts, and mixtures thereof. Suitable pH modifiers include acetate, formate, and the like. Suitable pH modifiers have no or only weak calcium sequestration capability at the pH of the use solution.

The pH modifier can be present at amounts listed in the tables or about 1 to about 70 wt-% or about 2 to about 50 wt-%, about 3 to about 30 wt-%.

Processing Aid

Processing aids are materials which enhance the production process for the detergent composition. They can serve as drying agents, modify the rate of solidification, alter the transfer of water of hydration in the formula, or even act as the solidifying matrix itself. Processing aids can have some overlap with other functionalities in the formula. Nonlimiting examples include silica, alkali metal silicates, urea, polyethylene glycols, solid surfactants, sodium carbonate, potassium chloride, sodium sulfate, sodium hydroxide, water, etc. Which processing aid(s) is suitable would of course vary with the manufacturing procedure and specific detergent composition.

The processing aid can be present at amounts of about 1 to about 70 wt-%, about 2 to about 50 wt-%, about 3 to about 30 wt-%.

Active Oxygen Compounds

The active oxygen compound acts to provide a source of active oxygen, but can also act to form at least a portion of the solidification agent. The active oxygen compound can be inorganic or organic, and can be a mixture thereof. Some examples of active oxygen compound include peroxygen compounds, and peroxygen compound adducts that are suitable for use in forming the binding agent.

Many active oxygen compounds are peroxygen compounds. Any peroxygen compound generally known and that can function, for example, as part of the binding agent can be used. Examples of suitable peroxygen compounds include inorganic and organic peroxygen compounds, or mixtures thereof.

The active oxygen compound can be in the present solid composition at amounts of about 1 to about 80 wt-%, about 5 to about 50 wt-%, or about 10 wt-% to about 40 wt-%.

Inorganic Active Oxygen Compound

Examples of inorganic active oxygen compounds include the following types of compounds or sources of these compounds, or alkali metal salts including these types of compounds, or forming an adduct therewith:

hydrogen peroxide;

group 1 (IA) active oxygen compounds, for example lithium peroxide, sodium peroxide, and the like;

group 2 (IIA) active oxygen compounds, for example magnesium peroxide, calcium peroxide, strontium peroxide, barium peroxide, and the like;

group 12 (IIB) active oxygen compounds, for example zinc peroxide, and the like;

group 13 (IIIA) active oxygen compounds, for example boron compounds, such as perborates, for example sodium perborate hexahydrate of the formula $Na_2[Br_2(O_2)_2(OH)_4]$ .$6H_2O$ (also called sodium perborate tetrahydrate and formerly written as $NaBO_3.4H_2O$); sodium peroxyborate tetrahydrate of the formula $Na_2Br_2(O_2)_2[(OH)_4]$. $4H_2O$ (also called sodium perborate trihydrate, and formerly written as $NaBO_3.3H_2O$); sodium peroxyborate of the formula $Na_2[B_2(O_2)_2(OH)_4]$ (also called sodium perborate monohydrate and formerly written as $NaBO_3.H_2O$); and the like; e.g., perborate;

group 14 (IVA) active oxygen compounds, for example persilicates and peroxycarbonates, which are also called percarbonates, such as persilicates or peroxycarbonates of alkali metals; and the like; e.g., percarbonate, e.g., persilicate;

group 15 (VA) active oxygen compounds, for example peroxynitrous acid and its salts; peroxyphosphoric acids and their salts, for example, perphosphates; and the like; e.g., perphosphate;

group 16 (VIA) active oxygen compounds, for example peroxysulfuric acids and their salts, such as peroxymonosulfuric and peroxydisulfuric acids, and their salts, such as persulfates, for example, sodium persulfate; and the like; e.g., persulfate;

group VIIa active oxygen compounds such as sodium periodate, potassium perchlorate and the like.

Other active inorganic oxygen compounds can include transition metal peroxides; and other such peroxygen compounds, and mixtures thereof.

In certain embodiments, the compositions and methods of the present invention employ certain of the inorganic active oxygen compounds listed above. Suitable inorganic active oxygen compounds include hydrogen peroxide, hydrogen peroxide adduct, group 111A active oxygen compounds, group VIA active oxygen compound, group VA active oxygen compound, group VIIA active oxygen compound, or mixtures thereof. Examples of such inorganic active oxygen compounds include percarbonate, perborate, persulfate, perphosphate, persilicate, or mixtures thereof. Hydrogen peroxide presents an example of an inorganic active oxygen compound. Hydrogen peroxide can be formulated as a mixture of hydrogen peroxide and water, e.g., as liquid hydrogen peroxide in an aqueous solution. The mixture of solution can include about 5 to about 40 wt-% hydrogen peroxide or 5 to 50 wt-% hydrogen peroxide.

In an embodiment, the inorganic active oxygen compounds include hydrogen peroxide adduct. For example, the inorganic active oxygen compounds can include hydrogen peroxide, hydrogen peroxide adduct, or mixtures thereof. Any of a variety of hydrogen peroxide adducts are suitable for use in the present compositions and methods. For example, suitable hydrogen peroxide adducts include percarbonate salt, urea peroxide, peracetyl borate, an adduct of $H_2O_2$ and polyvinyl pyrrolidone, sodium percarbonate, potassium percarbonate, mixtures thereof, or the like. Suitable hydrogen peroxide adducts include percarbonate salt, urea peroxide, peracetyl borate, an adduct of $H_2O_2$ and polyvinyl pyrrolidone, or mixtures thereof. Suitable hydrogen peroxide adducts include sodium percarbonate, potassium percarbonate, or mixtures thereof, e.g., sodium percarbonate.

Organic Active Oxygen Compound

Any of a variety of organic active oxygen compounds can be employed in the compositions and methods of the present invention. For example, the organic s active oxygen compound can be a peroxycarboxylic acid, such as a mono- or di-peroxycarboxylic acid, an alkali metal salt including these types of compounds, or an adduct of such a compound. Suitable peroxycarboxylic acids include $C_1$-$C_{24}$ peroxycarboxylic acid, salt of $C_1$-$C_{24}$ peroxycarboxylic acid, ester of $C_1$-$C_{24}$ peroxycarboxylic acid, diperoxycarboxylic acid, salt of diperoxycarboxylic acid, ester of diperoxycarboxylic acid, or mixtures thereof.

Suitable peroxycarboxylic acids include $C_1$-$C_{10}$ aliphatic peroxycarboxylic acid, salt of $C_1$-$C_{10}$ aliphatic peroxycarboxylic acid, ester of $C_1$-$C_{10}$ aliphatic peroxycarboxylic acid, or mixtures thereof; e.g., salt of or adduct of peroxyacetic acid; e.g., peroxyacetyl borate. Suitable diperoxycarboxylic acids include $C_4$-$C_{10}$ aliphatic diperoxycarboxylic acid, salt of $C_4$-$C_{10}$ aliphatic diperoxycarboxylic acid, or ester of $C_4$-$C_{10}$ aliphatic diperoxycarboxylic acid, or mixtures thereof; e.g., a sodium salt of perglutaric acid, of persuccinic acid, of peradipic acid, or mixtures thereof.

Organic active oxygen compounds include other acids including an organic moiety. Suitable organic active oxygen compounds include perphosphonic acids, perphosphonic acid salts, perphosphonic acid esters, or mixtures or combinations thereof.

Active Oxygen Compound Adducts

Active oxygen compound adducts include any generally known and that can function, for example, as a source of active oxygen and as part of the solidified composition. Hydrogen peroxide adducts, or peroxyhydrates, are suitable. Some examples of source of alkalinity adducts include the following: alkali metal percarbonates, for example sodium percarbonate (sodium carbonate peroxyhydrate), potassium percarbonate, rubidium percarbonate, cesium percarbonate, and the like; ammonium carbonate peroxyhydrate, and the like; urea peroxyhydrate, peroxyacetyl borate; an adduct of $H_2O_2$ polyvinyl pyrrolidone, and the like, and mixtures of any of the above.

Antimicrobials

Antimicrobial agents are chemical compositions that can be used in a solid functional material that alone, or in combination with other components, act to reduce or prevent microbial contamination and deterioration of commercial products material systems, surfaces, etc. In some aspects, these materials fall in specific classes including phenolics, halogen compounds, quaternary ammonium compounds, metal derivatives, amines, alkanol amines, nitro derivatives, analides, organosulfur and sulfur-nitrogen compounds and miscellaneous compounds.

It should also be understood that the source of alkalinity used in the formation of compositions embodying the invention also act as antimicrobial agents, and can even provide sanitizing activity. In fact, in some embodiments, the ability of the source of alkalinity to act as an antimicrobial agent reduces the need for secondary antimicrobial agents within the composition. For example, percarbonate compositions have been demonstrated to provide excellent antimicrobial action. Nonetheless, some embodiments incorporate additional antimicrobial agents.

The given antimicrobial agent, depending on chemical composition and concentration, may simply limit further proliferation of numbers of the microbe or may destroy all or a portion of the microbial population. The terms "microbes" and "microorganisms" typically refer primarily to bacteria, virus, yeast, spores, and fungus microorganisms. In use, the antimicrobial agents are typically formed into a solid functional material that when diluted and dispensed, optionally, for example, using an aqueous stream forms an aqueous disinfectant or sanitizer composition that can be contacted with a variety of surfaces resulting in prevention of growth or the killing of a portion of the microbial population. A three log reduction of the microbial population results in a sanitizer composition. The antimicrobial agent can be encapsulated, for example, to improve its stability.

Common antimicrobial agents include phenolic antimicrobials such as pentachlorophenol, orthophenylphenol, a chloro-p-benzylphenol, p-chloro-m-xylenol. Halogen containing antibacterial agents include sodium trichloroisocyanurate, sodium dichloro isocyanate (anhydrous or dihydrate), iodine-poly(vinylpyrrolidinone) complexes, bromine compounds such as 2-bromo-2-nitropropane-1,3-diol, and quaternary antimicrobial agents such as benzalkonium chloride, and didecyldimethyl ammonium chloride. Other antimicrobial compositions such as hexahydro-1,3,5-tris(2-hydroxyethyl)-s-triazine, dithiocarbamates such as sodium dimethyldithiocarbamate, and a variety of other materials are known in the art for their anti-microbial properties. In some embodiments, an antimicrobial component, such as TAED can be included in the range of 0.001 to 75 wt-% of the composition, about 0.01 to 20 wt-%, or about 0.05 to about 10 wt-%.

If present in compositions, the additional antimicrobial agent can be those listed in a table or about 0.01 to about 30 wt-% of the composition, 0.05 to about 10 wt-%, or about 0.1 to about 5 wt-%. In a use solution the additional antimicrobial agent can be about 0.001 to about 5 wt-% of the composition, about 0.01 to about 2 wt-%, or about 0.05 to about 0.5 wt-%.

Activators

In some embodiments, the antimicrobial activity or bleaching activity of the composition can be enhanced by the addition of a material which, when the composition is placed in use, reacts with the active oxygen to form an activated component. For example, in some embodiments, a peracid or a peracid salt is formed. For example, in some embodiments, tetraacetylethylene diamine can be included within the composition to react with the active oxygen and form a peracid or a peracid salt that acts as an antimicrobial agent. Other examples of active oxygen activators include transition metals and their compounds, compounds that contain a carboxylic, nitrile, or ester moiety, or other such compounds known in the art. In an embodiment, the activator includes tetraacetylethylene diamine; transition metal; compound that includes carboxylic, nitrile, amine, or ester moiety; or mixtures thereof.

In some embodiments, an activator component can include in the range of 0.001 to 75 wt-%, about 0.01 to about 20 wt-%, or about 0.05 to about 10 wt-% of the composition.

In an embodiment, the activator for the source of alkalinity combines with the active oxygen to form an antimicrobial agent.

The solid composition typically remains stable even in the presence of activator of the source of alkalinity. In many compositions it would be expected to react with and destabilize or change the form of the source of alkalinity. In contrast, in an embodiment of the present invention, the composition remains solid; it does not swell, crack, or enlarge as it would if the source of alkalinity were reacting with the activator.

In an embodiment, the composition includes a solid block, and an activator material for the active oxygen is coupled to the solid block. The activator can be coupled to the solid block by any of a variety of methods for coupling one solid cleaning composition to another. For example, the activator can be in the form of a solid that is bound, affixed, glued or otherwise adhered to the solid block. Alternatively, the solid activator can be formed around and encasing the block. By way of further example, the solid activator can be coupled to the solid block by the container or package for the cleaning composition, such as by a plastic or shrink wrap or film.

Additional Bleaching Agents

Additional bleaching agents for use in inventive formulations for lightening or whitening a substrate, include bleaching compounds capable of liberating an active halogen species, such as $Cl_2$, $Br_2$, $I_2$, $ClO_2$, $BrO_2$, $IO_2$, $—OCl^-$, $—OBr^-$ and/or, $—OI^-$, under conditions typically encountered during the cleansing process. Suitable bleaching agents for use in the present cleaning compositions include, for example, chlorine-containing compounds such as a chlorite, a hypochlorite, chloramine. Suitable halogen-releasing compounds include the alkali metal dichloroisocyanurates, chlorinated trisodium phosphate, the alkali metal hypochlorites, alkali metal chlorites, monochloramine and dichloramine, and the like, and mixtures thereof. Encapsulated chlorine sources may also be used to enhance the stability of the chlorine source in the composition (see, for example, U.S. Pat. Nos. 4,618,914 and 4,830,773, the disclosure of which is incorporated by reference herein). A bleaching agent may also be an additional peroxygen or active oxygen source such as hydrogen peroxide, perborates, for example sodium perborate mono and tetrahydrate, sodium carbonate peroxyhydrate, phosphate peroxyhydrates, and potassium permonosulfate, with and without activators such as tetraacetylethylene diamine, and the like, as discussed above.

A cleaning composition may include a minor but effective additional amount of a bleaching agent above that already available from the stabilized source of alkalinity, e.g., about 0.1-10 wt-% or about 1-6 wt-%. The present solid compositions can include bleaching agent in an amount those listed in a table or about 0.1 to about 60 wt-%, about 1 to about 20 wt-%, about 3 to about 8 wt-%, or about 3 to about 6 wt-%.

Hardening Agents

The detergent compositions may also include a hardening agent in addition to, or in the form of, the builder. A hardening agent is a compound or system of compounds, organic or inorganic, which significantly contributes to the uniform solidification of the composition. The hardening agents should be compatible with the cleaning agent and other active ingredients of the composition and should be capable of providing an effective amount of hardness and/or aqueous solubility to the processed detergent composition. The hardening agents should also be capable of forming a homogeneous matrix with the cleaning agent and other ingredients when mixed and solidified to provide a uniform dissolution of the cleaning agent from the detergent composition during use.

The amount of hardening agent included in the detergent composition will vary according to factors including, but not limited to: the type of detergent composition being prepared, the ingredients of the detergent composition, the intended use of the detergent composition, the quantity of dispensing solution applied to the detergent composition over time during use, the temperature of the dispensing solution, the hardness of the dispensing solution, the physical size of the detergent composition, the concentration of the other ingredients, and the concentration of the cleaning agent in the composition. The amount of the hardening agent included in the solid detergent composition should be effective to combine with the cleaning agent and other ingredients of the composition to form a homogeneous mixture under continuous mixing conditions and a temperature at or below the melting temperature of the hardening agent.

The hardening agent may also form a matrix with the cleaning agent and other ingredients which will harden to a solid form under ambient temperatures of about 30° C. to about 50° C., particularly about 35° C. to about 45° C., after mixing ceases and the mixture is dispensed from the mixing system, within about 1 minute to about 3 hours, particularly about 2 minutes to about 2 hours, and particularly about 5 minutes to about 1 hour. A minimal amount of heat from an external source may be applied to the mixture to facilitate processing of the mixture. The amount of the hardening agent included in the detergent composition should be effective to provide a desired hardness and desired rate of controlled solubility of the processed composition when placed in an aqueous medium to achieve a desired rate of dispensing the cleaning agent from the solidified composition during use.

The hardening agent may be an organic or an inorganic hardening agent. A particular organic hardening agent is a polyethylene glycol (PEG) compound. The solidification rate of detergent compositions comprising a polyethylene glycol hardening agent will vary, at least in part, according to the amount and the molecular weight of the polyethylene glycol added to the composition. Examples of suitable polyethylene glycols include, but are not limited to: solid polyethylene glycols of the general formula $H(OCH_2CH_2)_nOH$, where n is greater than 15, more particularly about 30 to about 1700. Typically, the polyethylene glycol is a solid in the form of a free-flowing powder or flakes, having a molecular weight of about 1,000 to about 100,000, particularly having a molecular weight of at least about 1,450 to about 20,000, more particularly between about 1,450 to about 8,000. The polyethylene glycol is present at a concentration of from about 1% to about 75% by weight and particularly about 3% to about 15% by weight. Suitable polyethylene glycol compounds include, but are not limited to: PEG 4000, PEG 1450, and PEG 8000 among others, with PEG 4000 and PEG 8000 being most preferred. An example of a commercially available solid polyethylene glycol includes, but is not limited to: CARBOWAX, available from Union Carbide Corporation, Houston, Tex.

Particular inorganic hardening agents are hydratable inorganic salts, including, but not limited to: sulfates, acetates, and bicarbonates. In an exemplary embodiment, the inorganic hardening agents are present at concentrations of up to about 50% by weight, particularly about 5% to about 25% by weight, and more particularly about 5% to about 15% by weight.

Urea particles may also be employed as hardeners in the detergent compositions. The solidification rate of the compositions will vary, at least in part, to factors including, but not limited to: the amount, the particle size, and the shape of the urea added to the detergent composition. For example, a particulate form of urea may be combined with a cleaning agent and other ingredients, as well as a minor but effective amount of water. The amount and particle size of the urea is effective to combine with the cleaning agent and other ingredients to form a homogeneous mixture without the application of heat from an external source to melt the urea and other ingredients to a molten stage. The amount of urea included in the solid detergent composition should be effective to provide a desired hardness and desired rate of solubility of the composition when placed in an aqueous medium to achieve a desired rate of dispensing the cleaning agent from the solidified composition during use. In an exemplary embodiment, the detergent composition includes between about 5% to about 90% by weight urea, particularly between about 8% and about 40% by weight urea, and more particularly between about 10% and about 30% by weight urea.

The urea may be in the form of prilled beads or powder. Prilled urea is generally available from commercial sources as a mixture of particle sizes ranging from about 8-15 U.S. mesh, as for example, from Arcadian Sohio Company, Nitrogen Chemicals Division. A prilled form of urea is milled to reduce the particle size to about 50 U.S. mesh to about 125 U.S. mesh, particularly about 75-100 U.S. mesh, particularly using a wet mill such as a single or twin-screw extruder, a Teledyne mixer, a Ross emulsifier, and the like.

Secondary Hardening Agents/Solubility Modifiers.

The present compositions may include a minor but effective amount of a secondary hardening agent, as for example, an amide such stearic monoethanolamide or lauric diethanolamide, or an alkylamide, and the like; a solid polyethylene glycol, or a solid EO/PO block copolymer, and the like; starches that have been made water-soluble through an acid or alkaline treatment process; various inorganics that impart solidifying properties to a heated composition upon cooling, and the like. Such compounds may also vary the solubility of the composition in an aqueous medium during use such that the cleaning agent and/or other active ingredients may be dispensed from the solid composition over an extended period of time. The composition may include a secondary hardening agent in an amount those listed in a table or about 5 to about 20 wt-% or about 10 to about 15 wt-%.

Detergent Fillers

A cleaning composition may include an effective amount of one or more of a detergent filler which does not perform as a cleaning agent per se, but cooperates with the cleaning agent to enhance the overall processability of the composition. Examples of fillers suitable for use in the present cleaning compositions include sodium sulfate, sodium chloride, starch, sugars, $C_1$-$C_{10}$ alkylene glycols such as propylene glycol, and the like. A filler such as a sugar (e.g. sucrose) can aid dissolution of a solid composition by acting as a disintegrant. A detergent filler can be included in an amount listed in a table or up to about 50 wt-%, of about 1 to about 20 wt-%, about 3 to about 15 wt-%, about 1 to about 30 wt-%, or about 1.5 to about 25 wt-%.

Defoaming Agents

An effective amount of a defoaming agent for reducing the stability of foam may also be included in the present cleaning compositions. The cleaning composition can include about 0.0001-5 wt-% of a defoaming agent, e.g., about 0.01-3 wt-%. The defoaming agent can be provided in an amount of about 0.0001% to about 10 wt-%, about 0.001% to about 5 wt-%, or about 0.01% to about 1.0 wt-%.

Examples of defoaming agents suitable for use in the present compositions include silicone compounds such as silica dispersed in polydimethylsiloxane, EO/PO block copolymers, alcohol alkoxylates, fatty amides, hydrocarbon waxes, fatty acids, fatty esters, fatty alcohols, fatty acid soaps, ethoxylates, mineral oils, polyethylene glycol esters, alkyl phosphate esters such as monostearyl phosphate, and the like. A discussion of defoaming agents may be found, for example, in U.S. Pat. No. 3,048,548 to Martin et al., U.S. Pat. No. 3,334,147 to Brunelle et al., and U.S. Pat. No. 3,442,242 to Rue et al., the disclosures of which are incorporated by reference herein.

Anti-redeposition Agents

A cleaning composition may also include an anti-redeposition agent capable of facilitating sustained suspension of soils in a cleaning solution and preventing the removed soils from being redeposited onto the substrate being cleaned. Examples of suitable anti-redeposition agents include fatty acid amides, fluorocarbon surfactants, complex phosphate esters, styrene maleic anhydride copolymers, and cellulosic derivatives such as hydroxyethyl cellulose, hydroxypropyl cellulose, and the like. A cleaning composition may include about 0.5 to about 10 wt-%, e.g., about 1 to about 5 wt-%, of an anti-redeposition agent.

Optical Brighteners

Optical brightener is also referred to as fluorescent whitening agents or fluorescent brightening agents provide optical compensation for the yellow cast in fabric substrates. With optical brighteners yellowing is replaced by light emitted from optical brighteners present in the area commensurate in scope with yellow color. The violet to blue light supplied by the optical brighteners combines with other light reflected from the location to provide a substantially complete or enhanced bright white appearance. This additional light is produced by the brightener through fluorescence. Optical brighteners absorb light in the ultraviolet range 275 through 400 nm. and emit light in the ultraviolet blue spectrum 400-500 nm.

Fluorescent compounds belonging to the optical brightener family are typically aromatic or aromatic heterocyclic materials often containing condensed ring system. An important feature of these compounds is the presence of an uninterrupted chain of conjugated double bonds associated with an aromatic ring. The number of such conjugated double bonds is dependent on substituents as well as the planarity of the fluorescent part of the molecule. Most brightener compounds are derivatives of stilbene or 4,4'-diamino stilbene, biphenyl, five membered heterocycles (triazoles, oxazoles, imidazoles, etc.) or six membered heterocycles (cumarins, naphthalamides, triazines, etc.). The choice of optical brighteners for use in detergent compositions will depend upon a number of factors, such as the type of detergent, the nature of other components present in the detergent composition, the temperature of the wash water, the degree of agitation, and the ratio of the material washed to the tub size. The brightener selection is also dependent upon the type of material to be cleaned, e.g., cottons, synthetics, etc. Since most laundry detergent products are used to clean a variety of fabrics, the detergent compositions should contain a mixture of brighteners which are effective for a variety of fabrics. It is of course necessary that the individual components of such a brightener mixture be compatible.

Optical brighteners useful in the present invention are commercially available and will be appreciated by those skilled in the art. Commercial optical brighteners which may be useful in the present invention can be classified into subgroups, which include, but are not necessarily limited to, derivatives of stilbene, pyrazoline, coumarin, carboxylic acid, methinecyanines, dibenzothiophene-5,5-dioxide, azoles, 5- and 6-membered-ring heterocycles and other miscellaneous agents. Examples of these types of brighteners are disclosed in "The Production and Application of Fluorescent Brightening Agents", M. Zahradnik, Published by John Wiley & Sons, New York (1982), the disclosure of which is incorporated herein by reference.

Stilbene derivatives which may be useful in the present invention include, but are not necessarily limited to, derivatives of bis(triazinyl)amino-stilbene; bisacylamino derivatives of stilbene; triazole derivatives of stilbene; oxadiazole derivatives of stilbene; oxazole derivatives of stilbene; and styryl derivatives of stilbene.

For laundry cleaning or sanitizing compositions, suitable optical brighteners include stilbene derivatives, which can be employed at concentrations of up to 1 wt-%.

Stabilizing Agents

The solid detergent composition may also include a stabilizing agent. Examples of suitable stabilizing agents include, but are not limited to: borate, calcium/magnesium ions, propylene glycol, and mixtures thereof. The composition need not include a stabilizing agent, but when the composition includes a stabilizing agent, it can be included in an amount that provides the desired level of stability of the composition. Suitable ranges of the stabilizing agent include those listed in a table or up to about 20 wt-%, about 0.5 to about 15 wt-%, or about 2 to about 10 wt-%.

Dispersants

The solid detergent composition may also include a dispersant. Examples of suitable dispersants that can be used in the solid detergent composition include, but are not limited to: maleic acid/olefin copolymers, polyacrylic acid, and mixtures thereof. The composition need not include a dispersant, but when a dispersant is included it can be included in an amount that provides the desired dispersant properties. Suitable ranges of the dispersant in the composition can be those listed in a table or up to about 20 wt-%, about 0.5 to about 15 wt-%, or about 2 to about 9 wt-%.

Enzymes

Enzymes that can be included in the solid detergent composition include those enzymes that aid in the removal of starch and/or protein stains. Suitable types of enzymes include, but are not limited to: proteases, alpha-amylases, and mixtures thereof. Suitable proteases that can be used include, but are not limited to: those derived from *Bacillus licheniformix, Bacillus lenus, Bacillus alcalophilus*, and *Bacillus amyloliquefacins*. Suitable alpha-amylases include *Bacillus subtilis, Bacillus amyloliquefaciens*, and *Bacillus licheniformis*. The composition need not include an enzyme, but when the composition includes an enzyme, it can be included in an amount that provides the desired enzymatic activity when the solid detergent composition is provided as a use composition. Suitable ranges of the enzyme in the composition include those listed in a table or up to about 15 wt-%, about 0.5 to about 10 wt-%, or about 1 to about 5 wt-%.

Thickeners

The solid detergent compositions can include a rheology modifier or a thickener. The rheology modifier may provide the following functions: increasing the viscosity of the compositions; increasing the particle size of liquid use solutions when dispensed through a spray nozzle; providing the use solutions with vertical cling to surfaces; providing particle suspension within the use solutions; or reducing the evaporation rate of the use solutions.

The rheology modifier may provide a use composition that is pseudo plastic, in other words the use composition or material when left undisturbed (in a shear mode), retains a high viscosity. However, when sheared, the viscosity of the material is substantially but reversibly reduced. After the shear action is removed, the viscosity returns. These properties permit the application of the material through a spray head. When sprayed through a nozzle, the material undergoes shear as it is drawn up a feed tube into a spray head under the influence of pressure and is sheared by the action of a pump in a pump action sprayer. In either case, the viscosity can drop to a point such that substantial quantities of the material can be applied using the spray devices used to apply the material to a soiled surface. However, once the material comes to rest on a soiled surface, the materials can regain high viscosity to ensure that the material remains in place on the soil. In an embodiment, the material can be applied to a surface resulting in a substantial coating of the material that provides the cleaning components in sufficient concentration to result in lifting and removal of the hardened or baked-on soil. While in contact with the soil on vertical or inclined surfaces, the thickeners in conjunction with the other components of the cleaner minimize dripping, sagging, slumping or other movement of the material under the effects of gravity. The material should be formulated such that the viscosity of the material is adequate to maintain contact substantial quantities of the film of the material with the soil for at least a minute, five minutes or more.

Examples of suitable thickeners or rheology modifiers are polymeric thickeners including, but not limited to: polymers or natural polymers or gums derived from plant or animal sources. Such materials may be polysaccharides such as large polysaccharide molecules having substantial thickening capacity. Thickeners or rheology modifiers also include clays.

A substantially soluble polymeric thickener can be used to provide increased viscosity or increased conductivity to the use compositions. Examples of polymeric thickeners for the aqueous compositions of the invention include, but are not limited to: carboxylated vinyl polymers such as polyacrylic acids and sodium salts thereof, ethoxylated cellulose, polyacrylamide thickeners, cross-linked, xanthan compositions, sodium alginate and algin products, hydroxypropyl cellulose, hydroxyethyl cellulose, and other similar aqueous thickeners that have some substantial proportion of water solubility. Examples of suitable commercially available thickeners include, but are not limited to: Acusol, available from Rohm & Haas Company, Philadelphia, Pa.; and Carbopol, available from B.F. Goodrich, Charlotte, N.C.

Examples of suitable polymeric thickeners include, but not limited to: polysaccharides. An example of a suitable commercially available polysaccharide includes, but is not limited to, Diutan, available from Kelco Division of Merck, San Diego, Calif. Thickeners for use in the solid detergent compositions further include polyvinyl alcohol thickeners, such as, fully hydrolyzed (greater than 98.5 mol acetate replaced with the —OH function).

An example of a suitable polysaccharide includes, but is not limited to, xanthans. Such xanthan polymers are suitable due to their high water solubility, and great thickening power. Xanthan is an extracellular polysaccharide of *Xanthomonas campestras*. Xanthan may be made by fermentation based on corn sugar or other corn sweetener by-products. Xanthan includes a poly beta-(1-4)-D-Glucopyranosyl backbone chain, similar to that found in cellulose. Aqueous dispersions of xanthan gum and its derivatives exhibit novel and remarkable rheological properties. Low concentrations of the gum have relatively high viscosities which permit it to be used economically. Xanthan gum solutions exhibit high pseudo plasticity, i.e. over a wide range of concentrations, rapid shear thinning occurs that is generally understood to be instantaneously reversible. Non-sheared materials have viscosities that appear to be independent of the pH and independent of temperature over wide ranges. Suitable xanthan materials include crosslinked xanthan materials. Xanthan polymers can be crosslinked with a variety of known covalent reacting crosslinking agents reactive with the hydroxyl functionality of large polysaccharide molecules and can also be crosslinked using divalent, trivalent or polyvalent metal ions. Such crosslinked xanthan gels are disclosed in U.S. Pat. No. 4,782,901, which is herein incorporated by reference. Suitable crosslinking agents for xanthan materials include, but are not limited to: metal cations such as Al+3, Fe+3, Sb+3, Zr+4 and other transition metals. Examples of suitable commercially available xanthans include, but are not limited to: KELTROL®, KELZAN® AR, KELZAN® D35, KELZAN® S, KELZAN® XZ, available from Kelco Division of Merck, San Diego, Calif. Known organic crosslinking agents can also be used. A suitable crosslinked xanthan is KELZAN® AR, which provides a pseudo plastic use solution that can produce large particle size mist or aerosol when sprayed.

The thickener can be in the present composition at amounts listed in a table or about 0.05 to about 10 wt-%, about 0.1 to about 8 wt-%, or about 0.2 wt-% to about 6 wt-%.

Dyes/Odorants

Various dyes, odorants including perfumes, and other aesthetic enhancing agents may also be included in the composition. Dyes may be included to alter the appearance of the composition, as for example, Direct Blue 86 (Miles), Fastusol Blue (Mobay Chemical Corp.), Acid Orange 7 (American Cyanamid), Basic Violet 10 (Sandoz), Acid Yellow 23 (GAF), Acid Yellow 17 (Sigma Chemical), Sap Green (Keyston Analine and Chemical), Metanil Yellow (Keystone Analine and Chemical), Acid Blue 9 (Hilton Davis), Sandolan Blue/Acid Blue 182 (Sandoz), Hisol Fast Red (Capitol Color and Chemical), Fluorescein (Capitol Color and Chemical), Acid Green 25 (Ciba-Geigy), and the like.

Fragrances or perfumes that may be included in the compositions include, for example, terpenoids such as citronellol, aldehydes such as amyl cinnamaldehyde, a jasmine such as C1S-jasmine or jasmal, vanillin, and the like.

The dye or odorant can be in the present solid composition at amounts of about 0.005 to about 5 wt-%, about 0.01 to about 3 wt-%, or about 0.2 wt-% to about 3 wt-%.

Use Compositions

The present exhausted threshold agent composition or a composition containing the exhausted threshold agent composition can be provided in the form of a concentrate or a use solution. In general, a concentrate refers to a composition that is intended to be diluted with water to provide a use solution that contacts an object to provide the desired cleaning, rising, or the like. A use solution may be prepared from the concentrate by diluting the concentrate with water at a dilution ratio that provides a use solution having desired detersive properties. In an exemplary embodiment, the concentrate may be diluted at a weight ratio of diluent to concentrate of at least about 1:1 or about 1:1 to about 2000:1.

The concentrate may be diluted with water at the location of use to provide the use solution. When the detergent composition is used in an automatic warewashing or dishwashing machine, it is expected that that the location of use will be inside the automatic warewashing machine. For example, when the detergent composition is used in a residential warewashing machine, the composition may be placed in the detergent compartment of the warewashing machine. Depending on the machine, the detergent may be provided in a unit dose form or in a multi-use form. In larger warewashing machines, a large quantity of detergent composition may be provided in a compartment that allows for the release of a single dose amount of the detergent composition for each wash cycle. Such a compartment may be provided as part of the warewashing machine or as a separate structure connected to the warewashing machine. For example, a block of the detergent composition may be provided in a hopper and introduced into the warewashing machine when water is sprayed against the surface of the block to provide a liquid concentrate.

The detergent composition may also be dispensed from a spray-type dispenser. Briefly, a spray-type dispenser functions by impinging a water spray upon an exposed surface of the detergent composition to dissolve a portion of the detergent composition, and then immediately directing the use solution out of the dispenser to a storage reservoir or directly to a point of use. When used, the product may be removed from the packaging (e.g. film) and inserted into the dispenser. The spray of water may be made by a nozzle in a shape that conforms to the shape of the solid detergent composition. The dispenser enclosure may also closely fit the shape of the detergent composition to prevent introducing and dispensing an incorrect detergent composition.

Embodiments of Solids

The present invention also relates to solid cleaning compositions including the exhausted threshold agent composition. For example, the present invention includes a cast solid block of the exhausted threshold agent composition and other components as desired. By way of further example, the present invention includes a pressed solid block or puck including exhausted threshold agent composition.

According to the present invention, a solid cleaning composition of a exhausted threshold agent composition can be prepared by a method including: providing a powder or crystalline form of exhausted threshold agent composition; melting the powder or crystalline form of the exhausted threshold agent composition; transferring the molten exhausted threshold agent composition into a mold; and cooling the molten composition to solidify it.

According to the present invention, a solid cleaning composition of a exhausted threshold agent composition can be prepared by a method including: providing a powder or crystalline form of a exhausted threshold agent composition; gently pressing the exhausted threshold agent to form a solid (e.g., block or puck).

A solid cleaning or rinsing composition as used in the present disclosure encompasses a variety of forms including, for example, solids, pellets, blocks, and tablets, but not powders. It should be understood that the term "solid" refers to the state of the detergent composition under the expected conditions of storage and use of the solid cleaning composition. In general, it is expected that the detergent composition will remain a solid when provided at a temperature of up to about 100° F. or greater than 120° F.

In certain embodiments, the solid cleaning composition is provided in the form of a unit dose. A unit dose refers to a solid cleaning composition unit sized so that the entire unit is used during a single washing cycle. When the solid cleaning composition is provided as a unit dose, it can have a mass of about 1 g to about 50 g. In other embodiments, the composition can be a solid, a pellet, or a tablet having a size of about 50 g to 250 g, of about 100 g or greater, or about 40 g to about 11,000 g.

In other embodiments, the solid cleaning composition is provided in the form of a multiple-use solid, such as, a block or a plurality of pellets, and can be repeatedly used to generate aqueous detergent compositions for multiple washing cycles. In certain embodiments, the solid cleaning composition is provided as a solid having a mass of about 5 g to 10 kg. In certain embodiments, a multiple-use form of the solid cleaning composition has a mass of about 1 to 10 kg. In further embodiments, a multiple-use form of the solid cleaning composition has a mass of about 5 kg to about 8 kg. In other embodiments, a multiple-use form of the solid cleaning composition has a mass of about 5 g to about 1 kg, or about 5 g and to 500 g.

Packaging System

In some embodiments, the solid composition can be packaged. The packaging receptacle or container may be rigid or flexible, and composed of any material suitable for containing the compositions produced according to the invention, as for example glass, metal, plastic film or sheet, cardboard, cardboard composites, paper, and the like.

Advantageously, since the composition is processed at or near ambient temperatures, the temperature of the processed mixture is low enough so that the mixture may be formed directly in the container or other packaging system without structurally damaging the material. As a result, a wider variety of materials may be used to manufacture the container than those used for compositions that processed and dispensed under molten conditions.

Suitable packaging used to contain the compositions is manufactured from a flexible, easy opening film material.

Dispensing of the Processed Compositions

The solid cleaning composition according to the present invention can be dispensed in any suitable method generally known. The cleaning or rinsing composition can be dispensed from a spray-type dispenser such as that disclosed in U.S. Pat. Nos. 4,826,661, 4,690,305, 4,687,121, 4,426,362 and in U.S. Pat. Nos. Re 32,763 and 32,818, the disclosures of which are incorporated by reference herein. Briefly, a spray-type dispenser functions by impinging a water spray upon an exposed surface of the solid composition to dissolve a portion of the composition, and then immediately directing the concentrate solution including the composition out of the dispenser to a storage reservoir or directly to a point of use. When used, the product is removed from the package (e.g.) film and is inserted into the dispenser. The spray of water can be made by a nozzle in a shape that conforms to the solid shape. The dispenser enclosure can also closely fit the detergent shape in a dispensing system that prevents the introduction and dispensing of an incorrect detergent. The aqueous concentrate is generally directed to a use locus.

In an embodiment, the present composition can be dispensed by immersing either intermittently or continuously in water. The composition can then dissolve, for example, at a controlled or predetermined rate. The rate can be effective to maintain a concentration of dissolved cleaning agent that is effective for cleaning.

In an embodiment, the present composition can be dispensed by scraping solid from the solid composition and contacting the scrapings with water. The scrapings can be added to water to provide a concentration of dissolved cleaning agent that is effective for cleaning.

Methods Employing the Present Compositions

In an embodiment, the present invention includes methods employing the present exhausted threshold agent composition or a composition including the exhausted threshold agent composition. For example, in an embodiment, the present invention includes a method of reducing corrosion of a surface of a material exposed to alkalinity. The method includes contacting the surface with a liquid containing the exhausted threshold agent composition or a composition including the exhausted threshold agent composition. The liquid can include dissolved or dispersed composition. The method can also include providing the exhausted threshold agent composition or a composition including the threshold agent; and dissolving the composition in a liquid diluent (e.g., water). The method can apply the liquid to any of a variety of surfaces or objects including surfaces or objects including or made of glass, ceramic, porcelain, or aluminum.

The present composition may be applied in any situation where it is desired to prevent surface corrosion or etching. The present composition may be employed in a commercial warewashing detergent composition to protect articles from corrosion or etching in automatic dishwashing or warewashing machines during cleaning, in the cleaning of transportation vehicles, or in the cleaning of bottles. Applications in which the present composition may be used include: warewashing, rinse aids, vehicle cleaning and care applications, hard surface cleaning and destaining, kitchen and bath cleaning and destaining, cleaning-in-place operations in food and beverage production facilities, food processing equipment, general purpose cleaning and destaining, bottlewashing, and industrial or household cleaners.

Clean in Place

Other hard surface cleaning applications for the corrosion inhibitor compositions of the invention (or cleaning compositions including them) include clean-in-place systems (CIP), clean-out-of-place systems (COP), washer-decontaminators, sterilizers, textile laundry machines, ultra and nano-filtration systems and indoor air filters. COP systems can include readily accessible systems including wash tanks, soaking vessels, mop buckets, holding tanks, scrub sinks, vehicle parts washers, non-continuous batch washers and systems, and the like.

The cleaning of the in-place system or other surface (i.e., removal of unwanted offal therein) can be accomplished with a formulated detergent including the corrosion inhibitor compositions of the invention which is introduced with heated water. CIP typically employ flow rates on the order of about 40 to about 600 liters per minute, temperatures from ambient up to about 70° C., and contact times of at least about 10 seconds, for example, about 30 to about 120 seconds.

A method of cleaning substantially fixed in-place process facilities includes the following steps. The use solution of the invention is introduced into the process facilities at a temperature in the range of about 4° C. to 60° C. After introduction of the use solution, the solution is held in a container or circulated throughout the system for a time sufficient to clean the process facilities (i.e., to remove undesirable soil). After the surfaces have been cleaned by means of the present composition, the use solution is drained. Upon completion of the cleaning step, the system optionally may be rinsed with other materials such as potable water. The composition can be circulated through the process facilities for 10 minutes or less.

The present invention may be better understood with reference to the following examples. These examples are intended to be representative of specific embodiments of the invention, and are not intended as limiting the scope of the invention.

EXAMPLES

Example 1

Hardness Ions in Excess of Threshold Inhibitor Reduced Corrosion of Glass

Compositions of hardness ions (e.g., calcium and magnesium ions) and threshold inhibitor reduced corrosion of glass.

Materials and Methods

Three stock solutions were prepared, one with 50 ppm of Acusol 445N (a 48% active sodium polyacrylate (homopolymer, not crosslinked, ave. mw 4500) threshold inhibitor available from Rohm & Haas, Philadelphia, Pa.), a second with 200 ppm of calcium chloride, and a third with 200 ppm of magnesium chloride. Each of the solutions also contained 100 ppm of sodium hydroxide and 400 ppm of sodium carbonate as an alkalinity source to adjust the pHs of the solutions to 11. Mixtures of the three solutions were combined in various concentrations and stirred.

A soft borosilicate glass microscope slide was placed in each of the solutions. The glass microscope slides were incubated in the solution at 160° F. for 72 hours. After they were removed from the oven, the amount of silicon removed from each slide was measured. Generally, the more silicon removed, the greater the etching.

Results

Table 1 shows the component compositions and amount of silicon removed from the surface of the glass microscope slides.

TABLE 1

| Composition | Acusol 445N (ppm) | CaCl$_2$ (ppm) | MgCl$_2$ (ppm) | Silicon Removed From the Slide (ppm) |
|---|---|---|---|---|
| 1 | 100 | 0 | 0 | 8 |
| 2 | 75 | 25 | 0 | 41 |
| 3 | 50 | 50 | 0 | 42 |
| 4 | 25 | 75 | 0 | 40 |
| 5 | 0 | 100 | 0 | 30 |
| 6 | 0 | 75 | 25 | 23 |
| 7 | 0 | 50 | 50 | 23 |
| 8 | 0 | 25 | 75 | 19 |
| 9 | 0 | 0 | 100 | 10 |
| 10 | 50 | 25 | 25 | 32 |
| 11 | 25 | 50 | 25 | 28 |
| 12 | 25 | 25 | 50 | 22 |
| 13 | 75 | 12 | 13 | 33 |
| 14 | 12 | 75 | 13 | 28 |
| 15 | 12 | 13 | 75 | 24 |
| 16 | 75 | 0 | 25 | 36 |
| 17 | 50 | 0 | 50 | 28 |
| 18 | 25 | 0 | 75 | 17 |
| 19 | 33 | 33 | 34 | 32 |

FIG. 1 shows a ternary graph illustrating the reduced corrosion of the glass as a function of the concentrations of magnesium, calcium, and threshold agent. This ternary graph was produced by entering the raw data in Table 1 into an analytical program, Design Expert, version 6.0.11, available from Stat Ease, Minneapolis, Minn. The program analyzed the raw data to find a trend and developed the following equation, Equation 1:

Etch Rating=9.51859*Acusol 445N+30.74261*CaCl2+10.35787*MgCl2+97.69312*Acusol 445N*CCl2+81.65298*Acusol 445N*MgCl2+8.60658*CaCl2*MgCl2−235.15470*Acusol 445N*CaCl2*MgCl2+48.80601*Acusol 445N*CaCl2*(Acusol 445N−CaCl2)+83.29541*Acusol 445N*MgCl2*(Acusol 445N−MgCl2)−47.68735*CaCl2*MgCl2*(CaCl2−MgCl2)

Equation 1 was then plotted to create the ternary graph depicted in FIG. 1.

Discussion

FIG. 1 shows that the exhausted threshold agent reduced glass corrosion.

FIG. 1 illustrates trends regarding the ratio of the components of the exhausted threshold agent effective for reducing silicon removal from the glass slide. For example, a weight ratio of magnesium ion to calcium ion to threshold inhibitor of about 3-7:1-4:1-4 synergistically reduced silicon removal from the glass slide. This effective range of ratios includes subsets that are also synergistic. Synergistic subsets of the range of ratios include, for example, about 4-6:1-2.5:1-2.5, about 5:2.5:2.5, about 3-7:1-4:0.5-1.92, about 5:1-2.5:0.5-1.2, and about 5:2.5:1.2.

Trends were also observed between any two components of the exhausted threshold agent and the amount of silicon that was removed from the glass. One trend indicates that the amount of silicon removed decreases when the amount of magnesium ions is greater than the amount of calcium ions in the corrosion inhibitor. The ratio of magnesium ions to threshold inhibitor was also found to affect the amount of silicon that was removed. In particular, the trend indicates that the amount of silicon that was removed decreases when the amount of magnesium ions is greater than the amount of threshold inhibitor in the corrosion inhibitor. Another trend also indicates that the amount of silicon removed decreases when the amount of calcium ions is substantially equal to the amount of threshold inhibitor in the corrosion inhibitor.

Equation 1 also suggests that even in the substantial absence of magnesium and calcium ions, the corrosion resistance of glass surfaces will still increase as long as the threshold inhibitor is present in the corrosion inhibitor. In water essentially free of available magnesium ions and calcium ions, Equation 1 becomes:

$$\text{Etch Rating} = 9.51895 * \text{Acusol 445N}$$

A trend indicates that the threshold limit of Acusol 445N is exceeded at 25 ppm.

An exemplary ratio of threshold inhibitor to alkalinity source is about 1:5 or greater. An exemplary ratio of active threshold inhibitor to alkalinity source is about 1:10 or greater.

Example 2

Hardness Ions in Excess of Threshold Inhibitor Reduced Corrosion of Aluminum Compositions of hardness ions (e.g., calcium and magnesium ions) and threshold inhibitor reduced corrosion of aluminum.

Experiment 1

Materials and Methods

The test solutions were prepared as described above in Example 1. After the compositions were prepared, an aluminum coupon was placed in each of the solutions and incubated at 160° F. for 72 hours. Then, the aluminum coupons were removed from the oven and assigned a visual rating of either 1 or 2. 1 indicated that the level of aluminum etching to the surface was acceptable and 2 indicated that the level of aluminum etching to the surface was unacceptable.

Results

Table 2 shows the content of the compositions and the visual rating of the surfaces of the aluminum coupons. Compositions A-E are comparative compositions. Compositions 20-21 are compositions according to the present invention.

TABLE 2

| Composition | Acusol 445N (ppm) | CaCl$_2$ (ppm) | MgCl$_2$ (ppm) | Visual Rating |
|---|---|---|---|---|
| 20 | 12 | 50 | 100 | 1 |
| 21 | 16 | 66 | 66 | 1 |
| 22 | 6 | 26 | 150 | 1 |
| A | 0 | 0 | 0 | 2 |
| B | 25 | 50 | 50 | 2 |
| C | 38 | 24 | 24 | 2 |
| D | 6 | 150 | 26 | 2 |
| E | 12 | 100 | 50 | 2 |

Discussion

This data provides trends regarding the ratio of the components of the exhausted threshold agent effective for reducing surface etching to the aluminum coupons. For example, a weight ratio of magnesium ion to calcium ion to threshold inhibitor of about 4-25:4-5:0.5-2 synergistically reduced surface etching to the aluminum coupons. For example, compositions 20-22, which had a visual rating of 1, included magnesium ions to calcium ions to threshold inhibitor at a ratio of at least about 4:4:1. The range of ratios includes subsets that are also synergistic. Synergistic subsets of the range of ratios include, for example, about 4-25:4-5:0.24-0.96 and about 4:4:0.5. In contrast, the compositions that yielded an unacceptable visual rating were characterized by discoloration or reduced surface gloss of the coupon.

Individual trends were also observed between the amount of magnesium ions present in the exhausted threshold agent compared to the amount of calcium ions or threshold inhibitor present and the visual rating of the aluminum surface. One trend indicates that the visual rating of the aluminum surface was acceptable when the amount of magnesium ions was equal to or greater than the amount of calcium ions in the corrosion inhibitor. Another trend indicates that the visual rating of the aluminum surface was unacceptable when the ratio of magnesium ions to threshold inhibitor is about 2:1 or less. For example, the visual rating of the aluminum surface was unacceptable when the ratio of magnesium ions to active threshold inhibitor is about 2:0.5 or less.

Experiment 2

Materials and Methods

An aluminum corrosion study was thus performed using magnesium chloride, calcium chloride, and Acusol 445N. Aluminum coupons were exposed to various concentrations of magnesium chloride, calcium chloride, and 5 Acusol 445N at pH 11 and 160° F. The aluminum 6061 coupons were then exposed for 72 hours to each solution.

Results

Figure 2:
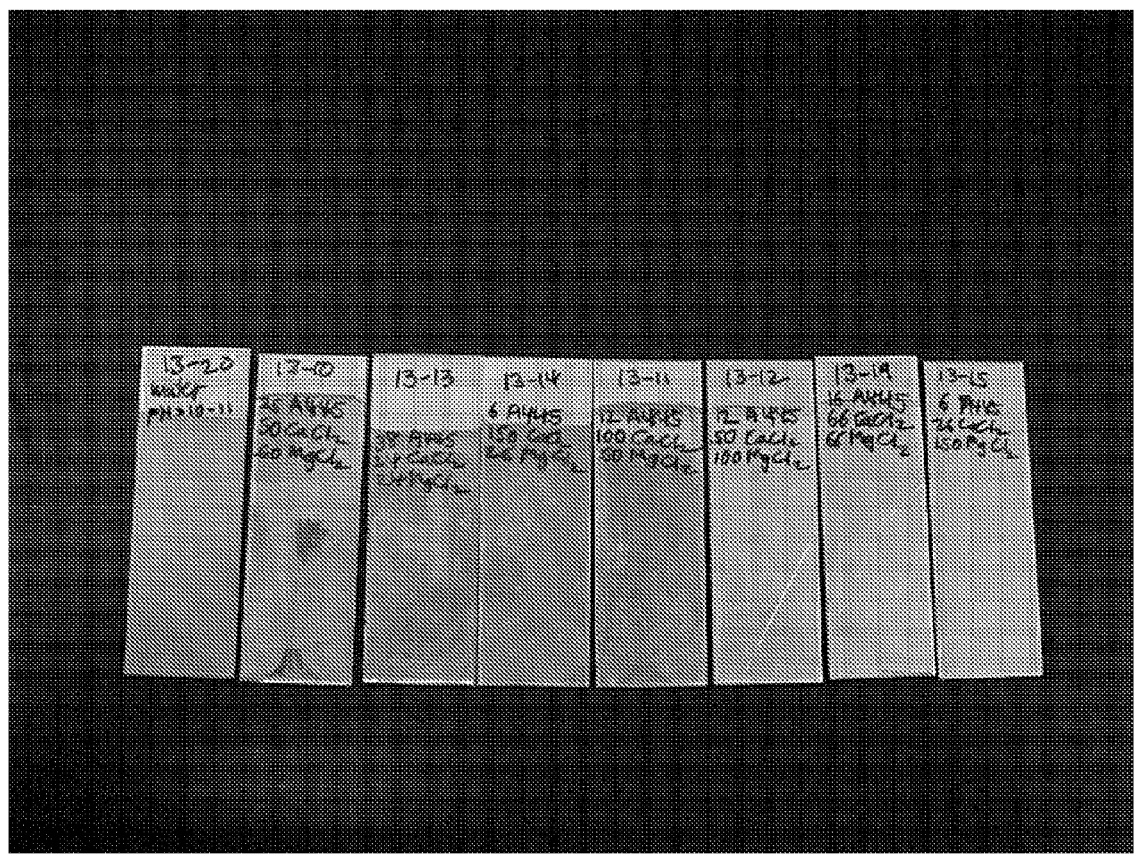
FIG. 2 is a photograph of the aluminum coupons tested in Example 2, Experiment 2, demonstrating reduced corrosion of aluminum by the present exhausted threshold agent.

The results are shown in FIG. 2, a photograph of the coupons. The region of synergy can be described as having a ratio of calcium chloride:magnesium chloride:Acusol 445N ranging from about 1-50:75-99:1-50 and also from about 0-10:0-10:90-100.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the term "configured" describes a system, apparatus, or other structure that is constructed or configured to perform a particular task or adopt a particular configuration. The term "configured" can be used interchangeably with other similar phrases such as arranged and configured, constructed and arranged, adapted and configured, adapted, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

The invention has been described with reference to various specific and preferred embodiments and techniques. However, it should be understood that many variations and modifications may be made while remaining within the spirit and scope of the invention.

I claim:

1. A hard surface cleaner comprising surfactant and about 0.01 to about 20 wt-% corrosion inhibitor; the corrosion inhibitor comprising:
   the reaction complex of a salt of a threshold agent and a water-soluble calcium and magnesium salt such that the salt cations of the threshold agent are fully exchanged, wherein the threshold agent is selected from the group consisting of polyacrylates, copolymers of polyacrylates, polymethacrylates, copolymes of polymethacrylates, polyacrylamides; copolymers of polyacrylamides, organophosphonates, polyglyoxylic acids, polyamidocarboxylic acids, modified polyamidocarboxylic acids, polyaspartic acid, and mixtures thereof;
   less than about 0.5 wt-% aluminum-containing compounds;
   wherein the weight ratio of water soluble magnesium salt to water soluble calcium salt is greater than or equal to about 1:1 and the weight ratio of water soluble calcium salt to threshold agent is about 1:2 and further wherein the hard surface cleaner is a solid and the composition is builder free.

2. The cleaner of claim 1, comprising about 0.1 to about 10 wt-% corrosion inhibitor.

3. The cleaner of claim 1, further comprising an alkalinity source, in an amount effective to provide a use composition having a pH of at least about 8 when measured at a concentration of about 0.5wt-%, wherein the alkalinity source is selected from the group consisting of alkali metal hydroxides, alkanolamines, and mixtures thereof.

4. The cleaner of claim 1, wherein the water soluble magnesium salt is selected from the group consisting of magnesium acetate, magnesium benzoate, magnesium bromide, magnesium bromate, magnesium chlorate, magnesium chloride, magnesium chromate, magnesium citrate, magnesium formate, magnesium hexafluorosilicate, magnesium iodate, magnesium iodide, magnesium lactate, magnesium molybdate, magnesium nitrate, magnesium perchlorate, magnesium phosphinate, magnesium salicylate, magnesium sulfate, magnesium sulfite, magnesium thiosulfate, a hydrate thereof, and a mixture thereof.

5. The cleaner of claim 1, wherein the water soluble calcium salt is selected from the group consisting of calcium acetate, calcium benzoate, calcium bromate, calcium bromide, calcium chlorate, calcium chloride, calcium chromate, calcium dihydrogen phosphate, calcium dithionate, calcium formate, calcium gluconate, calcium glycerophosphate, calcium hydrogen sulfide, calcium iodide, calcium lactate, calcium metasilicate, calcium nitrate, calcium nitrite, calcium pantothenate, calcium perchlorate, calcium permanganate, calcium phosphate, calcium phosphinate, calcium salicylate, calcium succinate, a hydrate thereof, and a mixture thereof.

6. The cleaner of claim 1, comprising less than about 0.5 wt-% zinc-containing compounds.

7. The cleaner of claim 1, comprising less than about 0.5 wt-% phosphorous-containing compounds.

8. The composition of claim 1, comprising about 0.05 wt. % to about 15 wt. % surfactant.

9. The composition of claim 1, wherein the surfactant is selected from the group consisting of anionic surfactant, nonionic surfactant, cationic surfactant, zwitterionic surfactant, and a mixture thereof.

10. A method of cleaning a hard surface, the method comprising:
   providing a hard surface cleaner according to claim 1;
   preparing an aqueous use composition of the hard surface cleaner; and
   contacting the hard surface with the aqueous use composition.

* * * * *